United States Patent
Yamaguchi et al.

(10) Patent No.: US 9,626,923 B2
(45) Date of Patent: Apr. 18, 2017

(54) DISPLAY DEVICE AND ELECTRONIC APPARATUS

(71) Applicant: Japan Display Inc., Tokyo (JP)

(72) Inventors: Hidemasa Yamaguchi, Tokyo (JP); Masaaki Kabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/157,942

(22) Filed: Jan. 17, 2014

(65) Prior Publication Data
US 2014/0204072 A1    Jul. 24, 2014

(30) Foreign Application Priority Data

Jan. 23, 2013  (JP) .................................. 2013-010563
Dec. 4, 2013   (JP) .................................. 2013-251553

(51) Int. Cl.
    G09G 3/36       (2006.01)
    G02F 1/136      (2006.01)
    (Continued)

(52) U.S. Cl.
    CPC .......... *G09G 3/3648* (2013.01); *G06F 3/041* (2013.01); *G06F 3/044* (2013.01); *G06F 3/0412* (2013.01);
    (Continued)

(58) Field of Classification Search
    CPC ... G09G 2300/0443; G09G 2300/0452; G09G 2300/0823; G09G 3/3648; G09G 3/3614;
    (Continued)

(56) References Cited

U.S. PATENT DOCUMENTS 4,916,308 A  *  4/1990  Meadows ..................... 250/221
5,648,793 A  *  7/1997  Chen .............................. 345/96
(Continued)

FOREIGN PATENT DOCUMENTS

CN     101551562 A    10/2009
CN     102142221 A    8/2011
(Continued)

OTHER PUBLICATIONS

Korean Office Action issued Jan. 20, 2015 for corresponding Korean Application No. 10-2014-6689.
(Continued)

*Primary Examiner* — Ilana Spar
*Assistant Examiner* — Mihir Rayan
(74) *Attorney, Agent, or Firm* — Michael Best & Friedrich LLP

(57) ABSTRACT

According to an aspect, a display device includes an image display panel, data lines, and scan lines. The image display panel includes arrays of pixels including a plurality of sub-pixels. The arrays of pixels include cyclically arranged columns of first columns each of which includes first sub-pixels, second columns that include second sub-pixels, and third columns. Third sub-pixels and fourth sub-pixels are alternately arranged in the third columns in the direction along the third columns, and are alternately arranged in a direction along the row in the same row of the third columns. Each of the scan lines is coupled to either of the third sub-pixels adjacent thereto or the fourth sub-pixels adjacent thereto, as sub-pixels to be selected thereby.

4 Claims, 24 Drawing Sheets

(51) Int. Cl.
  *G09G 5/02* (2006.01)
  *G06F 3/041* (2006.01)
  *G06F 3/044* (2006.01)
  *G02F 1/1362* (2006.01)

(52) U.S. Cl.
  CPC ..... *G09G 3/3614* (2013.01); *G02F 1/136213* (2013.01); *G02F 2201/52* (2013.01); *G09G 5/02* (2013.01); *G09G 2300/0452* (2013.01); *G09G 2300/0491* (2013.01); *G09G 2300/0495* (2013.01); *G09G 2320/0209* (2013.01); *G09G 2320/0276* (2013.01); *G09G 2340/06* (2013.01)

(58) Field of Classification Search
  CPC ... G09G 2300/0495; G09G 2320/0276; G09G 2320/0209; G09G 5/02; G09G 2300/045; G09G 2300/0491; G06F 3/044; G06F 3/0412; G02F 1/136212
  See application file for complete search history.

(56) References Cited

U.S. PATENT DOCUMENTS

| | | | |
|---|---|---|---|
| 8,456,398 B2* | 6/2013 | Ito et al. | 345/90 |
| 2003/0197672 A1* | 10/2003 | Yun | G09G 3/3688 345/99 |
| 2005/0206596 A1 | 9/2005 | Chen et al. | |
| 2006/0262251 A1* | 11/2006 | Kim et al. | 349/106 |
| 2008/0062140 A1* | 3/2008 | Hotelling | G09G 3/3648 345/173 |
| 2009/0251629 A1* | 10/2009 | Ito | G09G 3/3614 349/41 |
| 2009/0322802 A1 | 12/2009 | Noguchi et al. | |
| 2010/0207969 A1* | 8/2010 | Ueki | G09G 3/3607 345/694 |
| 2011/0181634 A1* | 7/2011 | Higashi | G09G 3/3426 345/691 |
| 2011/0181635 A1 | 7/2011 | Kabe et al. | |
| 2012/0262389 A1 | 10/2012 | Kida et al. | |

FOREIGN PATENT DOCUMENTS

| | | |
|---|---|---|
| JP | 05-43118 | 6/1993 |
| JP | 11-218736 A | 8/1999 |
| JP | 2005-266803 A | 9/2005 |
| JP | 2006-106062 A | 4/2006 |
| JP | 2010-033014 A | 2/2010 |
| JP | 2011-154321 A | 8/2011 |
| JP | 2011-154323 | 8/2011 |
| JP | 2012-221422 A | 11/2012 |
| KR | 2011-0022074 A | 3/2011 |
| KR | 2011-0088400 A | 8/2011 |
| TW | 200816126 A | 4/2008 |
| WO | WO-2007/146785 A2 | 12/2007 |

OTHER PUBLICATIONS

Taiwanese Office Action issued Dec. 31, 2015 for corresponding Taiwanese Patent Application No. 103100848.
English Language Translation of the Chinese Office Action issued Feb. 3, 2016 for corresponding Chinese Application No. 201410030453.9.
Chinese Office Action issued Feb. 3, 2016 for corresponding Chinese Application No. 201410030453.9.
Japanese Office Action issued Nov. 1, 2016 for corresponding Japanese Application No. 2013-251553.

* cited by examiner

DISPLAY DEVICE AND ELECTRONIC APPARATUS

CROSS-REFERENCE TO RELATED APPLICATIONS

This application claims priority from Japanese Application No. 2013-010563, filed on Jan. 23, 2013, and Japanese Application No. 2013-251553, filed on Dec. 4, 2013, the contents of which are incorporated by reference herein in its entirety.

BACKGROUND

1. Technical Field

The present disclosure relates to a display device and to an electronic apparatus including the display device.

2. Description of the Related Art

Recent years have seen a growing demand for display devices for use in, for example, mobile devices such as a mobile phone and electronic paper. In a display device, one pixel includes a plurality of sub-pixels, each of which emits light of a different color. The single pixel displays various colors by switching on and off display of the sub-pixels. Such display devices have been improved year after year in display properties such as resolution and luminance. However, an increase in the resolution reduces an aperture ratio, and thus increases necessity for an increase in luminance of a backlight to achieve high luminance, which causes a problem of an increase in power consumption of the backlight. There is a technique (such as Japanese Patent Application Laid-open Publication No. 2010-33014) to improve this in which a white sub-pixel as a fourth sub-pixel is added to the conventional sub-pixels of red, green, and blue. This technique reduces the current value of the backlight because the luminance is increased by the white sub-pixel, and thereby reduces the power consumption.

There are known driving methods for an image display panel, such as a column inversion driving method, a line inversion driving method, a dot inversion driving method, and a frame inversion driving method. The column inversion driving method is a driving method in which voltages are applied so that adjacent single lines (columns) of sub-pixels or of pixels composed of combinations of sub-pixels have potentials different from each other with respect to a reference potential, and polarities of the applied voltages are inverted at a predetermined period. It is known that this causes the column inversion driving method to have smaller amounts of charge and discharge in signal lines, and thus to have lower power consumption than the dot inversion driving method.

Adding fourth sub-pixels to the image display panel increases the area per pixel of the image display panel. This has led to a requirement for higher definition. Therefore, a liquid crystal display panel has an arrangement in which three columns of first sub-pixels, second sub-pixels, and third sub-pixels are juxtaposed in sequence, and in third columns, the third sub-pixels and the fourth sub-pixels are alternately arranged in the row direction. As a result, an increase in the size of the pixel area can be suppressed even when the fourth sub-pixels are added, thereby achieving high definition. However, applying a technique of Japanese Examined Patent Application Publication No. H05-43118 to further suppress the power consumption can cause what is called crosstalk that reduces (deteriorates) display quality.

For the foregoing reasons, there is a need for a display device and to an electronic apparatus that suppress the power consumption and reduce the display quality deterioration.

SUMMARY

According to an aspect, a display device includes an image display panel, a display function layer, data lines, a control unit, and scan lines. The image display panel includes arrays of pixels including a plurality of sub-pixels. The arrays of pixels include cyclically arranged columns of first columns each of which includes first sub-pixels, second columns each of which is arranged next to the corresponding first column, and third columns each of which is arranged next to the corresponding second column. The display function layer has an image display function of displaying an image on the image display panel. Each of the data lines are coupled to one of the first columns, the second columns, and the third columns. The control unit drives the display function layer based on image signals by a column inversion driving method in which voltage applied to the data lines are different between the adjacent sub-pixels or between the adjacent pixels, and polarities of the applied voltages are inverted at a predetermined period. The control unit sequentially selects each row of the sub-pixels with the scan lines. Third sub-pixels and fourth sub-pixels are alternately arranged in the third columns in the direction along the third columns, and the third sub-pixels and the fourth sub-pixels are alternately arranged in a direction along the row in the same row of the third columns. Each of the scan lines is coupled to either of the third sub-pixels adjacent thereto or the fourth sub-pixels adjacent thereto, as sub-pixels to be selected thereby.

According to another aspect, an electronic apparatus includes the display device.

DETAILED DESCRIPTION

An embodiment for practicing the present invention will be described in detail with reference to the accompanying drawings. The description will be made in the following order.

Figure 1:
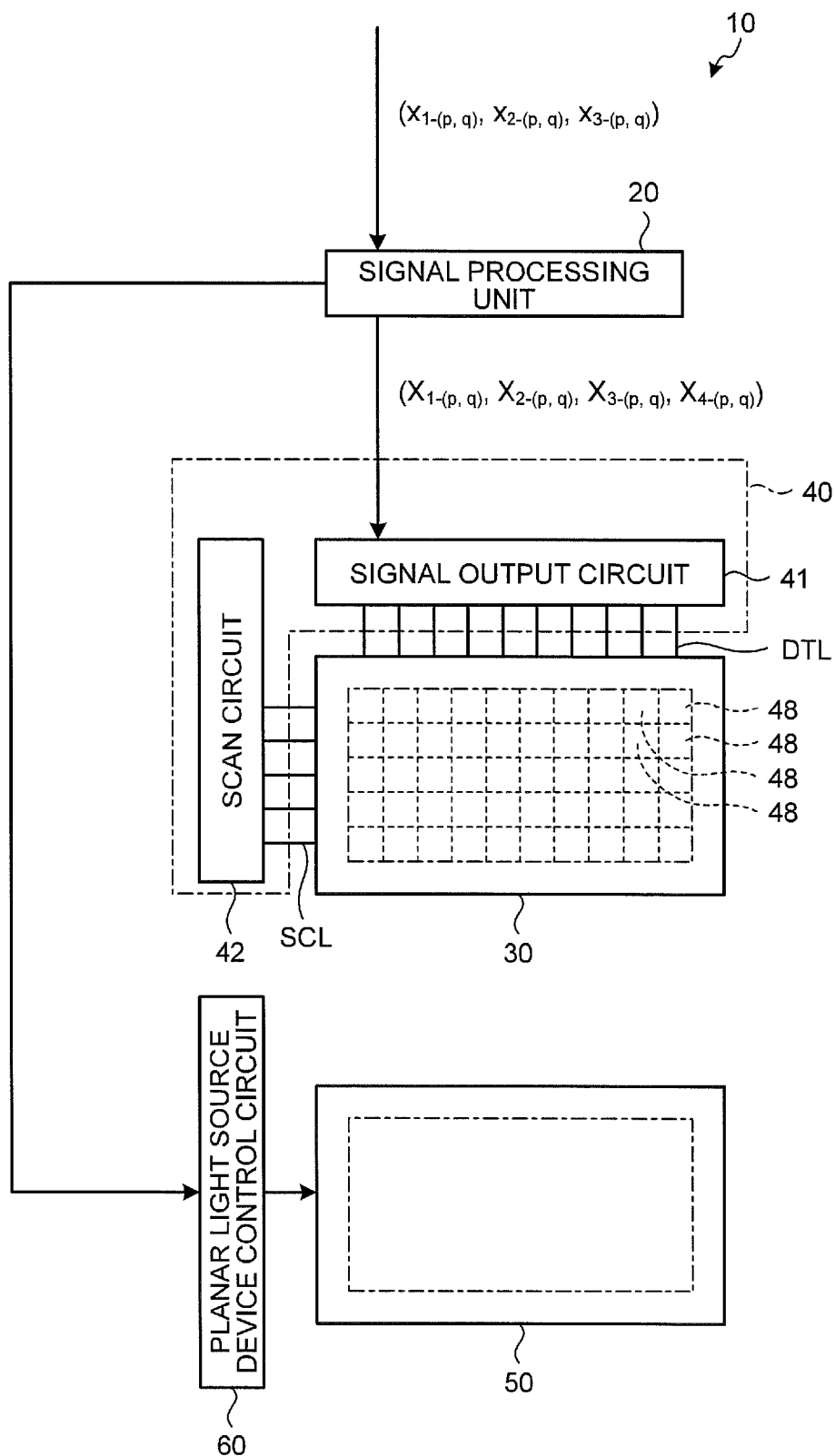
FIG. 1 is a block diagram illustrating an example of a configuration of a display device according to an embodiment.
Figure 2:
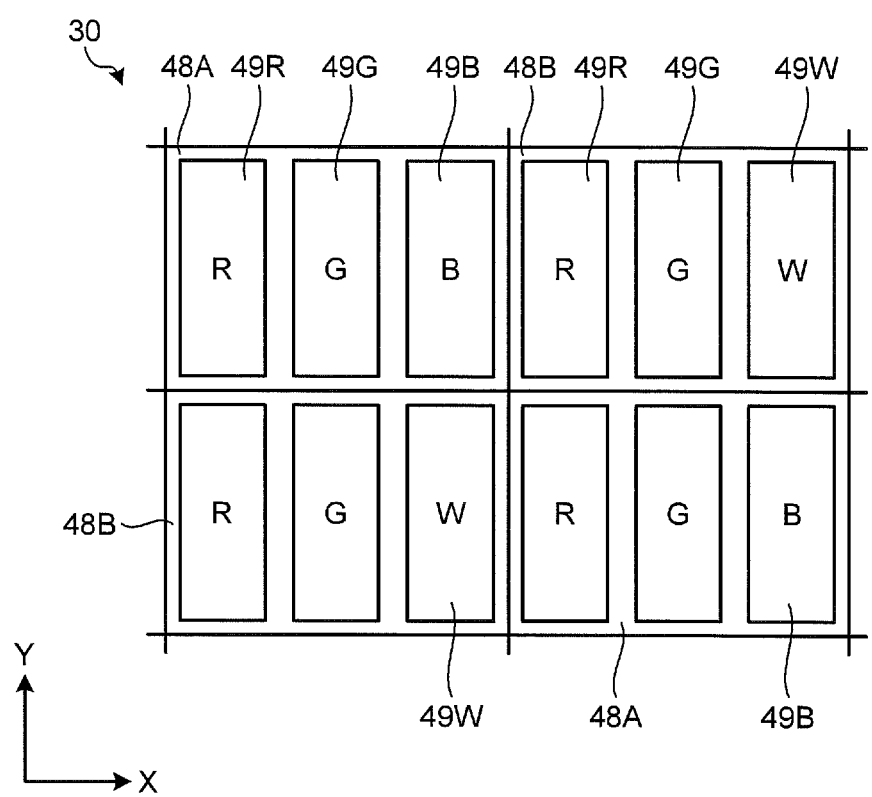
FIG. 2 is a diagram illustrating a pixel array of an image display panel according to the embodiment.
Figure 3:
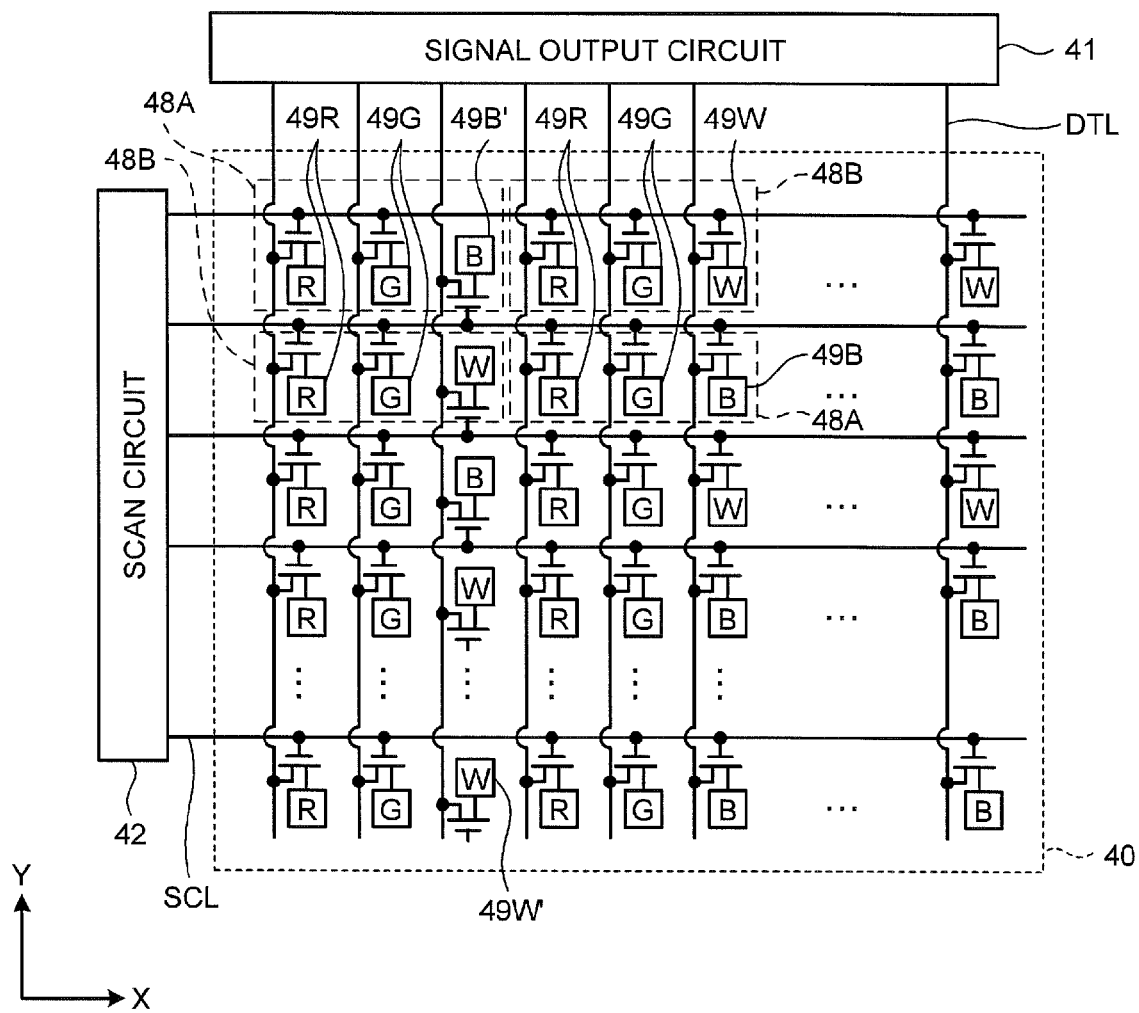
FIG. 3 is a conceptual diagram of the image display panel and an image display panel drive circuit of the display device according to the embodiment.

1. Configuration of display device
2. Processing operation of display device
3. Modifications
4. Application examples (electronic apparatus)
5. Aspects of present disclosure 1. Configuration of Display Device FIG. 1 is a block diagram illustrating an example of a configuration of a display device according to the present embodiment. FIG. 2 is a diagram illustrating a pixel array of an image display panel according to the present embodiment. FIG. 3 is a conceptual diagram of the image display panel and an image display panel drive circuit of the display device according to the present embodiment.

As illustrated in FIG. 1, this display device 10 includes a signal processing unit 20 that transmits signals to units of the display device 10 and controls operations thereof, an image display panel 30 that displays an image based on output signals output from the signal processing unit 20, an image display panel drive circuit 40 that controls drive of the image display panel 30, a planar light source device 50 that illuminates the image display panel 30 from the back side, and a planar light source device control circuit 60 that controls drive of the planar light source device 50. The display device 10 has the same configuration as that of an image display device assembly described in Japanese Patent Application Laid-open Publication No. 2011-154323 (JP-A-2011-154323), and various modifications described in JP-A-2011-154323 are applicable thereto.

The signal processing unit 20 is a processing unit that controls the operations of the image display panel 30 and the planar light source device 50. The signal processing unit 20 is coupled to the image display panel drive circuit 40 for driving the image display panel 30 and to the planar light source device control circuit 60 for driving the planar light source device 50. The signal processing unit 20 processes an externally supplied input signal, and generates output signals and a planar light source device control signal. In other words, the signal processing unit 20 generates the output signals by converting an input value (input signal) in an input HSV color space of the input signal into extended values (output signals) in an extended HSV color space extended in four colors of a first color, a second color, a third color, and a fourth color, and outputs the generated output signals to the image display panel 30. The signal processing unit 20 outputs the generated output signals to the image display panel drive circuit 40 and the generated planar light source device control signal to the planar light source device control circuit 60.

As illustrated in FIGS. 2 and 3, pixels 48 are arranged on the image display panel 30 in a two-dimensional matrix of $P_0 \times Q_0$ pixels ($P_0$ pixels in the row direction and $Q_0$ pixels in the column direction). The example illustrated in FIGS. 2 and 3 illustrates an example in which the pixels 48 are arranged in a matrix-like manner in a two-dimensional coordinate system of X and Y. In this example, the row direction corresponds to the X-direction, and the column direction corresponds to the Y-direction.

The pixels 48 include first sub-pixels 49R, second sub-pixels 49G, and third sub-pixels 49B or fourth sub-pixels 49W, respectively. The first sub-pixels 49R display a first primary color (such as red). The second sub-pixels 49G display a second primary color (such as green). The third sub-pixels 49B display a third primary color (such as blue). The fourth sub-pixels 49W display a fourth color (specifically, white). Hereinafter, the sub-pixels will be collectively called sub-pixels 49 when the first sub-pixels 49R, the second sub-pixels 49G, the third sub-pixels 49B, and the fourth sub-pixels 49W need not be distinguished from each other.

The display device 10 is more specifically a transmissive color liquid crystal display device. The image display panel 30 is a color liquid crystal display panel in which a first color filter through which the first primary color passes is disposed between a first sub-pixel 49R and an image observer, and a second color filter through which the second primary color passes is disposed between a second sub-pixel 49G and the image observer, and a third color filter through which the third primary color passes is disposed between a third sub-pixel 49B and the image observer. The image display panel 30 has no color filter disposed between a fourth sub-pixel 49W and the image observer. The fourth sub-pixel 49W may be provided with a transparent resin layer instead of the color filter. Providing the fourth sub-pixel 49W with the transparent resin layer allows the image display panel 30 to keep a large step from occurring at the fourth sub-pixel 49W caused by not providing the fourth sub-pixel 49W with the color filter.

Pixels 48A and pixels 48B each obtained by combining the sub-pixels including the first sub-pixel 49R, the second sub-pixel 49G, and the third sub-pixel 49B or the fourth sub-pixel 49W are arranged in a matrix-like manner on the image display panel 30. As illustrated in FIGS. 2 and 3, each of the pixels 48A includes a first sub-pixel 49R, a second sub-pixel 49G, and a third sub-pixel 49B, and each of the pixels 48B includes a first sub-pixel 49R, a second sub-pixel 49G, and a fourth sub-pixel 49W. The pixels 48A and 48B are alternately arranged in the row direction and in the column direction on the image display panel 30. The image display panel 30 includes the first, the second, and the third columns iteratively arranged thereon. The first column includes the first sub-pixels 49R arranged therealong. The second column is arranged as a column next to the corresponding first column and includes the second sub-pixels 49G arranged therealong. The third column is arranged next to the second column. In the third columns, the third sub-pixels 49B and the fourth sub-pixels 49W are alternately arranged in the row direction. In the same columns of the third columns, the third sub-pixels 49B and the fourth sub-pixels 49W are alternately arranged in the column direction.

In general, an arrangement similar to a stripe arrangement is preferable for displaying data and strings on a personal computer or the like. On the other hand, an arrangement similar to a mosaic arrangement is preferable for displaying natural images on a video camera recorder, a digital still camera, or the like.

The image display panel drive circuit 40 is a control device of the present embodiment, and includes a signal output circuit 41 and a scan circuit 42. The image display panel drive circuit 40 uses the signal output circuit 41 to hold and sequentially output video signals to the image display panel 30. The signal output circuit 41 is coupled to, electrically connected to, or directly connected to, the image display panel 30 via data lines (signal lines) DTL. The image display panel drive circuit 40 uses the scan circuit 42 to select the sub-pixels on the image display panel 30, and controls on and off of switching elements (such as thin film transistors [TFTs]) for controlling operations (optical transmittance) of the sub-pixels. The scan circuit 42 is electrically coupled to the image display panel 30 via scan lines SCL.

As illustrated in FIG. 3, the first column including the first sub-pixels 49R arranged therealong, the second column arranged as a column next to the corresponding first column and including the second sub-pixels 49G arranged therealong, and the third column arranged as a column next to the corresponding second column are iteratively arranged. In the third columns, the third sub-pixels 49B (49B') and the fourth sub-pixels 49W (49W') are alternately arranged in the row direction. This arrangement allows the luminance of the fourth sub-pixels 49W to supplement the luminance of the blue-colored third sub-pixels 49B whose human luminosity factor is lower than that of the first sub-pixels 49R and the second sub-pixels 49G. The sub-pixels 49 in the third columns and adjacent to each other in the direction along the row direction are arranged so that the third sub-pixels 49B' and the fourth sub-pixels 49W are alternately arranged in the same row of the third columns. Otherwise, the sub-pixels 49 in the third columns and adjacent to each other in the direction along the row direction are arranged so that the third sub-pixels 49B and the fourth sub-pixels 49W' are alternately arranged in the same row of the third columns. The third sub-pixels 49B' and the fourth sub-pixels 49W in the same row of the third columns are alternately coupled to different lines of the scan lines SCL. The third sub-pixels 49B and the fourth sub-pixels 49W' in the same row of the third columns are alternately coupled to different lines of the scan lines SCL. As a result, the sub-pixels 49 in the third columns selected by one of the scan lines SCL are the third sub-pixels 49B and the third sub-pixels 49B'. Otherwise, the sub-pixels 49 in the third columns selected by one of the scan lines SCL are the fourth sub-pixels 49W and the fourth sub-pixels 49W'.

The planar light source device 50 is disposed on the back side of the image display panel 30, and projects light toward the image display panel 30 to illuminate the image display panel 30. The planar light source device 50 projects the light onto the whole surface of the image display panel 30 to make the image display panel 30 bright. The planar light source device control circuit 60 controls, for example, light quantity of the light emitted from the planar light source device 50. Specifically, based on the planar light source device control signal output from the signal processing unit 20, the planar light source device control circuit 60 regulates the voltage or duty ratio of power supplied to the planar light source device 50 so as to control the light quantity of the light (intensity of the light) projected onto the image display panel 30. A description will next be made of a processing operation performed by the display device 10, more specifically, by the signal processing unit 20.

2. Processing Operation of Display Device

Figure 4:
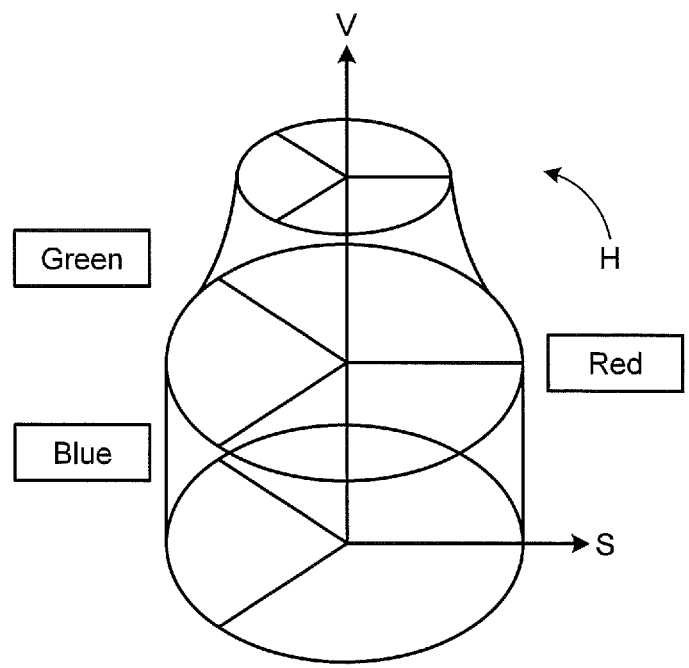
FIG. 4 is a conceptual diagram of an extended HSV color space that is extendable by the display device of the embodiment.
Figure 5:
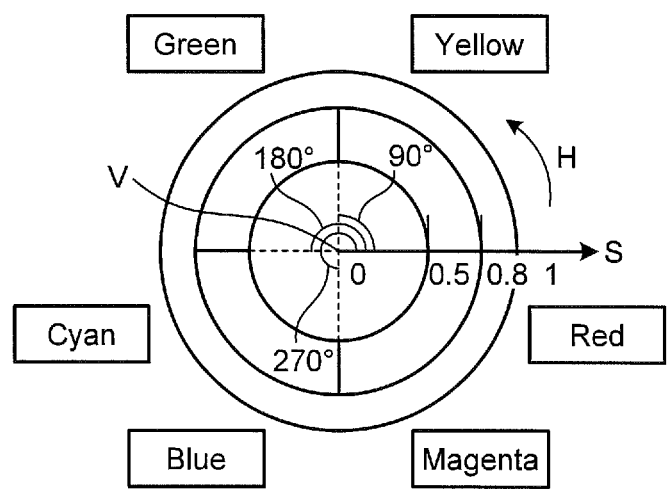
FIG. 5 is a conceptual diagram illustrating a relation between hue and saturation of the extended HSV color space.

FIG. 4 is a conceptual diagram of the extended HSV color space that is extendable by the display device of the present embodiment. FIG. 5 is a conceptual diagram illustrating a relation between hue and saturation of the extended HSV color space. The signal processing unit 20 externally receives an input signal that is information on an image to be displayed. The input signal includes, as input signals, information on images (colors) to be displayed by respective pixels in positions thereof. Specifically, the signal processing unit 20 receives the signal that includes, with respect to the (p, q)th pixel 48 (where $1 \leq p \leq P_0$ and $1 \leq q \leq Q_0$) on the image display panel 30 on which the $P_0 \times Q_0$ pixels 48 are arranged, an input signal for a first sub-pixel 49R having a signal value of $x_{1-(p, q)}$, an input signal for a second sub-pixel 49G having a signal value of $x_{2-(p, q)}$, and an input signal for a third sub-pixel 49B having a signal value of $x_{3-(p, q)}$ (refer to FIG. 1).

The signal processing unit 20 illustrated in FIG. 1 processes the input signals to generate an output signal (signal value $X_{1-(p, q)}$) for the first sub-pixel for determining the display gradation of the first sub-pixel 49R, an output signal (signal value $X_{2-(p, q)}$) for the second sub-pixel for determining the display gradation of the second sub-pixel 49G, an output signal (signal value $X_{3-(p, q)}$) for the third sub-pixel for determining the display gradation of the third sub-pixel 49B, and an output signal (signal value $X_{4-(p, q)}$) for the fourth sub-pixel for determining the display gradation of a fourth sub-pixel 49W, and outputs the generated output signals to the image display panel drive circuit 40.

By including a fourth sub-pixel 49W that outputs the fourth color (white) to a pixel 48, the display device 10 can increase a dynamic range of brightness in the HSV color space (extended HSV color space) as illustrated in FIG. 4. In other words, as illustrated in FIG. 4, the extended HSV color space has a shape obtained by placing a solid having a substantially trapezoidal body shape in which the maximum value of brightness value V is lower as a saturation value S is higher on a cylindrical HSV color space in which a first sub-pixel 49R, a second sub-pixel 49G, and a third sub-pixel 49B can perform display.

The signal processing unit 20 stores maximum values Vmax(S) of brightness with the saturation value S serving as a variable in the HSV color space expanded by the addition of the fourth color (white). In other words, with respect to the solid shape of the HSV color space illustrated in FIG. 4, the signal processing unit 20 stores the maximum values Vmax(S) of brightness for respective pairs of coordinates (values) of the saturation and the hue. Because the input signal includes the input signals for the first sub-pixel 49R, the second sub-pixel 49G, and the third sub-pixel 49B, the HSV color space of the input signal has a cylindrical shape, that is, the same shape as the cylindrical part of the extended HSV color space.

Next, based on at least the input signal (signal value $x_{1-(p, q)}$) and an extension coefficient α for the first sub-pixel 49R, the signal processing unit 20 calculates an output signal (signal value $X_{1-(p, q)}$) for the first sub-pixel 49R, and outputs the output signal to the first sub-pixel 49R. Based on at least the input signal (signal value $x_{2-(p, q)}$) and the extension coefficient α for the second sub-pixel 49G, the signal processing unit 20 calculates an output signal (signal value $X_{2-(p, q)}$) for the second sub-pixel 49G, and outputs the output signal to the second sub-pixel 49G. Based on at least the input signal (signal value $x_{3-(p, q)}$) and the extension coefficient α for the third sub-pixel 49B, the signal processing unit 20 calculates an output signal (signal value $X_{3-(p, q)}$) for the third sub-pixel 49B, and outputs the output signal to the third sub-pixel 49B. Based on the input signal (signal value $x_{1-(p, q)}$) for the first sub-pixel 49R, the input signal (signal value $x_{2-(p, q)}$) for the second sub-pixel 49G, and the input signal (signal value $x_{3-(p, q)}$) for the third sub-pixel 49B, the signal processing unit 20 calculates an output signal (signal value $X_{4-(p, q)}$) for the fourth sub-pixel 49W, and outputs the output signal to the fourth sub-pixel 49W.

Specifically, the signal processing unit 20 calculates the output signal for the first sub-pixel 49R based on the extension coefficient α for the first sub-pixel 49R and on the output signal for the fourth sub-pixel 49W, calculates the output signal for the second sub-pixel 49G based on the extension coefficient α for the second sub-pixel 49G and on the output signal for the fourth sub-pixel 49W, and calculates the output signal for the third sub-pixel 49B based on the extension coefficient α for the third sub-pixel 49B and on the output signal for the fourth sub-pixel 49W.

In other words, assuming χ as a constant depending on the display device, the signal processing unit 20 uses Equations (1) to (3) listed below to obtain the signal value $X_{1-(p, q)}$ serving as the output signal for the first sub-pixel 49R, the signal value $X_{2-(p, q)}$ serving as the output signal for the second sub-pixel 49G, and the signal value $X_{3-(p, q)}$ serving as the output signal for the third sub-pixel 49B. The output signals are to be output to the (p, q)th pixel (or, the (p, q)th set of the first sub-pixel 49R, the second sub-pixel 49G, and the third sub-pixel 49B).

$$X_{1-(p,q)} = \alpha \cdot x_{1-(p,q)} - \chi \cdot X_{4-(p,q)} \qquad (1)$$

$$X_{2-(p,q)} = \alpha \cdot x_{2-(p,q)} - \chi \cdot X_{4-(p,q)} \qquad (2)$$

$$X_{3-(p,q)} = \alpha \cdot x_{3-(p,q)} - \chi \cdot X_{4-(p,q)} \qquad (3)$$

The signal processing unit 20 obtains the maximum value Vmax(S) of brightness with the saturation value S serving as a variable in the HSV color space expanded by the addition of the fourth color, and based on the input signal values for the sub-pixels 49 in the pixels 48, obtains a saturation value S and a brightness value V(S) with respect to the pixels 48.

The saturation value S and the brightness value V(S) are expressed as S=(Max−Min)/Max and V(S)=Max, respectively. The saturation value S can have a value from 0 to 1, and the brightness value V(S) can have a value from 0 to $(2^n - 1)$. The exponent n is the number of display gradation bits. Max is the maximum of the input signal values supplied to the pixels 48 for the first sub-pixel 49R, for the second sub-pixel 49G, and for the third sub-pixel 49B. Min is the minimum of the input signal values supplied to the pixels 48 for the first sub-pixel 49R, for the second sub-pixel 49G, and for the third sub-pixel 49B. A hue H is expressed by a value from 0 degrees to 360 degrees as illustrated in FIG. 5. The hue H changes from 0 degrees toward 360 degrees as red, yellow, green, cyan, blue, magenta, and then red.

In the present embodiment, the signal value $X_{4\text{-}(p,\,q)}$ can be obtained based on the product of $\text{Min}_{(p,\,q)}$ and the extension coefficient $\alpha$. Specifically, the signal value $X_{4\text{-}(p,\,q)}$ can be obtained based on Equation (4) given below. Although Equation (4) divides the product of $\text{Min}_{(p,\,q)}$ and the extension coefficient $\alpha$ by $\chi$, the equation is not limited to this. The constant $\chi$ will be described later. The extension coefficient $\alpha$ is determined for each image display frame $$X_{4\text{-}(p,q)} = \text{Min}_{(p,q)} \cdot \alpha / \chi \tag{4}$$

In general, in the (p, q)th pixel 48, Equations (5) and (6) below can be used to obtain the saturation value $S_{(p,\,q)}$ and the brightness value $V(S)_{(p,\,q)}$ in the cylindrical HSV color space based on the input signal (signal value $x_{1\text{-}(p,\,q)}$) for the first sub-pixel 49R, the input signal (signal value $x_{2\text{-}(p,\,q)}$) for the second sub-pixel 49G, and the input signal (signal value $x_{3\text{-}(p,\,q)}$) for the third sub-pixel 49B.

$$S_{(p,q)} = (\text{Max}_{(p,q)} - \text{Min}_{(p,q)})/\text{Max}_{(p,q)} \tag{5}$$

$$V(S)_{(p,q)} = \text{Max}_{(p,q)} \tag{6}$$

$\text{Max}_{(p,\,q)}$ is the maximum value of the input signal values ($x_{1\text{-}(p,\,q)}$, $x_{2\text{-}(p,\,q)}$, and $x_{3\text{-}(p,\,q)}$) for the three sub-pixels 49. $\text{Min}_{(p,\,q)}$ is the minimum value of the input signal values ($x_{1\text{-}(p,\,q)}$, $x_{2\text{-}(p,\,q)}$, and $x_{3\text{-}(p,\,q)}$) for the three sub-pixels 49. The present embodiment assumes that n=8. In other words, the number of display gradation bits is assumed to be eight (the display gradation having a value in 256 levels of gradation from 0 to 255).

The fourth sub-pixel 49W displays white color, and thus is not provided with a color filter. Suppose that the first sub-pixel 49R is supplied with a signal having a value equivalent to the maximum signal value of the output signal for the first sub-pixel 49R, that the second sub-pixel 49G is supplied with a signal having a value equivalent to the maximum signal value of the output signal for the second sub-pixel 49G, and that the third sub-pixel 49B is supplied with a signal having a value equivalent to the maximum signal value of the output signal for the third sub-pixel 49B. In that case, a collective set of the first sub-pixel 49R, the second sub-pixel 49G, and the third sub-pixel 49B included in the pixel 48 or a group of the pixels 48 is assumed to have a luminance value of $BN_{1\text{-}3}$. Furthermore, suppose that the fourth sub-pixel 49W included in the pixel 48 or a group of the pixels 48 is supplied with a signal having a value equivalent to the maximum signal value of the output signal for the fourth sub-pixel 49W. In that case, the fourth sub-pixel 49W is assumed to have a luminance value of $BN_4$. In other words, the collective set of the first sub-pixel 49R, the second sub-pixel 49G, and the third sub-pixel 49B displays white color having a maximum luminance value, and the luminance of the white color is represented by $BN_{1\text{-}3}$. Then, assuming $\chi$ as a constant depending on the display device, the constant $\chi$ is expressed as $\chi = BN_4/BN_{1\text{-}3}$.

Specifically, suppose that the luminance $BN_{1\text{-}3}$ of the white color is obtained when the collective set of the first sub-pixel 49R, the second sub-pixel 49G, and the third sub-pixel 49B is supplied with the input signals having the following values of the display gradation, that is, the signal value $x_{1\text{-}(p,\,q)}$=255, the signal value $x_{2\text{-}(p,\,q)}$=255, and the signal value $x_{3\text{-}(p,\,q)}$=255. Furthermore, suppose that the luminance $BN_4$ is obtained when the fourth sub-pixel 49W is supplied with the input signal having a value of 255 as the display gradation. Then, the luminance BN4 has a value, for example, 1.5 times as large as the luminance $BN_{1\text{-}3}$. In other words, $\chi=1.5$ is satisfied in the present embodiment.

When the signal value $X_{4\text{-}(p,\,q)}$ is given by Equation (4) above, $V\max(S)$ can be expressed by Equations (7) and (8) given below.

When $S \leq S_0$, $$V\max(S) = (\chi+1) \cdot (2^n - 1) \tag{7}$$

When $S_0 < S \leq 1$, $$V\max(S) = (2^n - 1) \cdot (1/S) \tag{8}$$

where $S_0 = 1/(\chi+1)$.

The signal processing unit 20 stores, for example, as a kind of look-up table, the thus obtained maximum value $V\max(S)$ of brightness with the saturation value S serving as a variable in the HSV color space expanded by the addition of the fourth color. Otherwise, the signal processing unit 20 obtains the maximum value $V\max(S)$ of brightness with the saturation value S serving as a variable in the expanded HSV color space each time.

A description will next be made of a method (extension process) of obtaining the signal values $X_{1\text{-}(p,\,q)}$, $X_{2\text{-}(p,\,q)}$, $X_{3\text{-}(p,\,q)}$, and $X_{4\text{-}(p,\,q)}$ serving as the output signals in the (p, q)th pixel 48. The following process is performed so as to keep a ratio among the luminance of the first primary color displayed by the (first sub-pixel 49R+fourth sub-pixel 49W), the luminance of the second primary color displayed by the (second sub-pixel 49G+fourth sub-pixel 49W), and the luminance of the third primary color displayed by the (third sub-pixel 49B+fourth sub-pixel 49W). The following process is performed so as to also keep (maintain) a color tone. Further, the following process is performed so as to also keep (maintain) gradation-luminance characteristics (gamma characteristics, or $\gamma$ characteristics). When all of the input signal values are zero or small in any of the pixels 48 or any group of the pixels 48, the extension coefficient $\alpha$ may be obtained without including such a pixel 48 or such a group of the pixels 48.

First Step

First, based on the input signal values for the sub-pixels 49 in the pixels 48, the signal processing unit 20 obtains the saturation value S and the brightness value V(S) in the pixels 48. Specifically, based on the signal value $x_{1\text{-}(p,\,q)}$ serving as the input signal for the first sub-pixel 49R, the signal value $x_{2\text{-}(p,\,q)}$ serving as the input signal for the second sub-pixel 49G, and the signal value $x_{3\text{-}(p,\,q)}$ serving as the input signal for the third sub-pixel 49B in the (p, q)th pixel 48, the signal processing unit 20 obtains $S_{(p,\,q)}$ and $V(S)_{(p,\,q)}$ from Equations (7) and (8). The signal processing unit 20 applies this process to all of the pixels 48.

Second Step

The signal processing unit 20 subsequently obtains the extension coefficient $\alpha(S)$ based on $V\max(S)/V(S)$ obtained in the pixels 48.

$$\alpha(S) = V\max(S)/V(S) \tag{9}$$

Third Step

Next, based on at least the signal values $x_{1\text{-}(p,\,q)}$, $x_{2\text{-}(p,\,q)}$, and $x_{3\text{-}(p,\,q)}$, the signal processing unit 20 obtains the signal value $X_{4\text{-}(p,\,q)}$ in the (p, q)th pixel 48. In the present embodiment, the signal processing unit 20 determines the signal value $X_{4\text{-}(p,\,q)}$ based on $\text{Min}_{(p,\,q)}$, the extension coefficient $\alpha$, and the constant $\chi$. More specifically, the signal processing unit 20 obtains the signal value $X_{4\text{-}(p,\,q)}$ based on Equation (4) given above as described above. The signal processing unit 20 obtains the signal values $X_{4\text{-}(p, q)}$ in all of the $P_0 \times Q_0$ pixels 48.

Fourth Step

Thereafter, the signal processing unit 20 obtains the signal value $X_{1\text{-}(p, q)}$ in the (p, q)th pixel 48 based on the signal value $x_{1\text{-}(p, q)}$, the extension coefficient α, and the signal value $X_{4\text{-}(p, q)}$, obtains the signal value $X_{2\text{-}(p, q)}$ in the (p, q)th pixel 48 based on the signal value $X_{4\text{-}(p, q)}$, the extension coefficient α, and the signal value $X_{4\text{-}(p, q)}$, and obtains the signal value $X_{3\text{-}(p, q)}$ in the (p, q)th pixel 48 based on the signal value $x_{3\text{-}(p, q)}$, the extension coefficient α, and the signal value $X_{4\text{-}(p, q)}$. Specifically, the signal processing unit 20 obtains the signal values $X_{1\text{-}(p, q)}$, $X_{2\text{-}(p, q)}$, and $X_{3\text{-}(p, q)}$ in the (p, q)th pixel 48 based on Equations (1) to (3) given above.

As indicated by Equation (4), the signal processing unit 20 extends the value of $\text{Min}_{(p, q)}$ according to the extension coefficient α. In this manner, the extension of $\text{Min}_{(p, q)}$ according to the extension coefficient α increases the luminance of the white display sub-pixel (fourth sub-pixel 49W), and also increases the luminance of the red display sub-pixel, the green display sub-pixel, and the blue display sub-pixel (corresponding to the first sub-pixel 49R, the second sub-pixel 49G, and the third sub-pixel 49B, respectively) as indicated by Equations given above. This can avoid problems such as occurrence of dulling of colors. Specifically, the extension of the value of $\text{Min}_{(p, q)}$ according to the extension coefficient α increases the luminance of an entire image by a factor of a compared with a case in which the value of $\text{Min}_{(p, q)}$ is not extended. This allows, for example, a still image to be displayed at high luminance, which is desirable.

The signal values $X_{1\text{-}(p, q)}$, $X_{2\text{-}(p, q)}$, $X_{3\text{-}(p, q)}$, and $X_{4\text{-}(p, q)}$ in the (p, q)th pixel 48 are extended by a factor of a. This only requires the display device 10 to reduce the luminance of the planar light source device 50 based on the extension coefficient α in order to give the pixel 48 the same luminance as that of the pixel 48 with the signal values not extended. Specifically, the luminance of the planar light source device 50 only needs to be reduced by a factor of (1/α). The signal processing unit 20 calculates selector signals SELR, SELG, and SELB (SELW) to be described later so as to output the signal values $X_{1\text{-}(p, q)}$, $X_{2\text{-}(p, q)}$, $X_{3\text{-}(p, q)}$, and $X_{4\text{-}(p, q)}$ in the (p, q) th pixel 48.

2-1. Example of Horizontal Electric Field Mode Liquid Crystal Display Device

Figure 6:
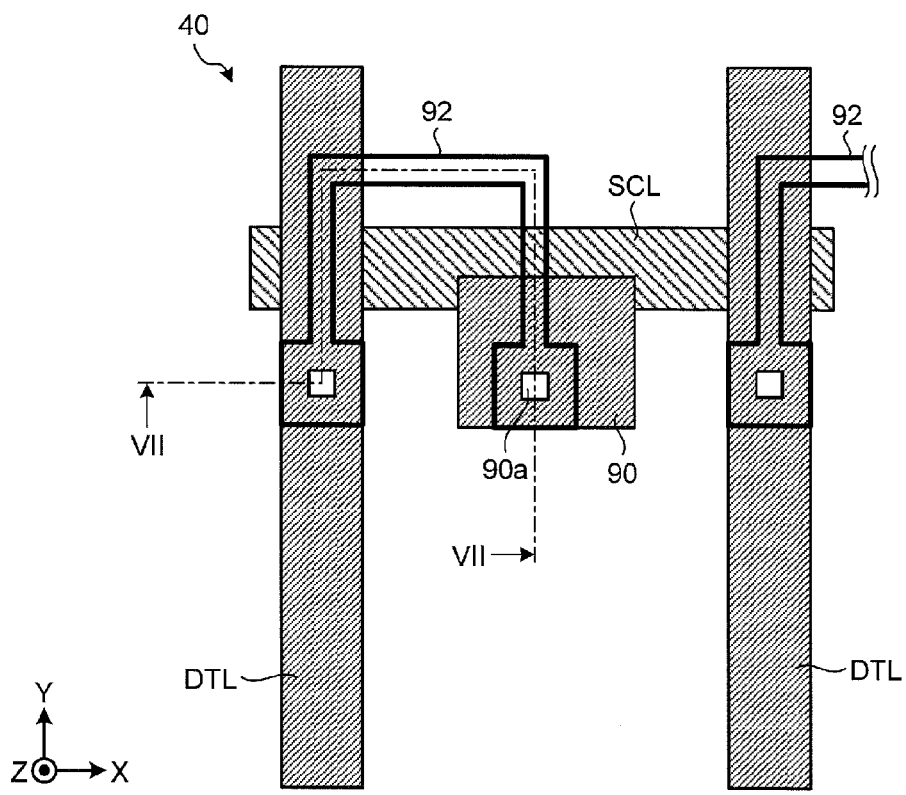
FIG. 6 is a schematic diagram for explaining a circuit pattern of the image display panel according to the embodiment.
Figure 7:
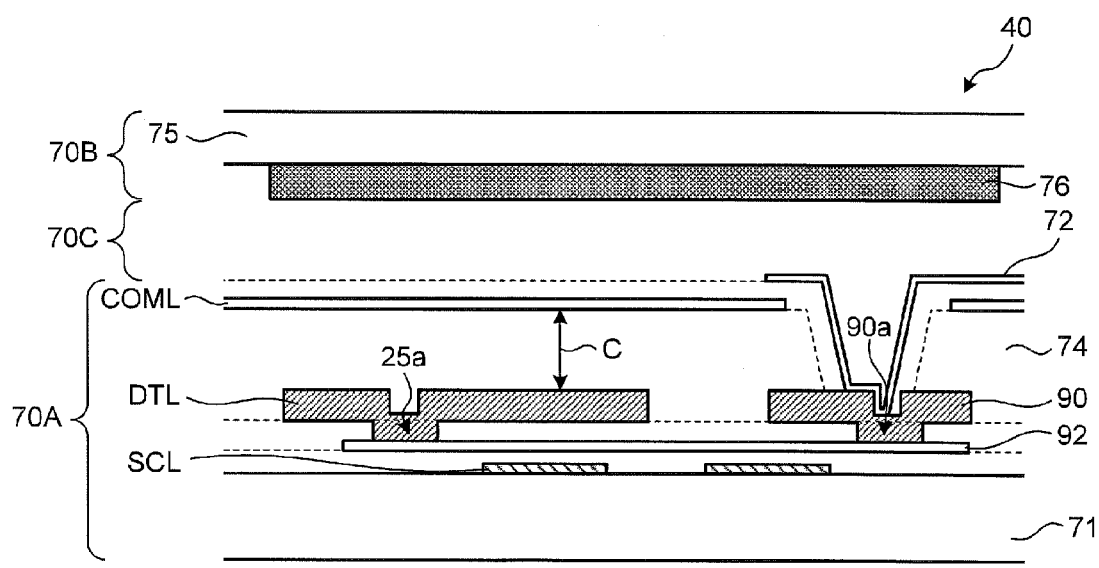
FIG. 7 is a VII-VII line sectional view of FIG. 6.

FIG. 6 is a schematic diagram for explaining a circuit pattern of the image display panel according to the present embodiment. FIG. 7 is a VII-VII line sectional view of FIG. 6. As illustrated in FIG. 7, the image display panel 30 includes a pixel substrate 70A, a counter substrate 70B disposed so as to be opposed in the orthogonal direction with respect to a surface of the pixel substrate 70A, and a liquid crystal layer 70C provided between the pixel substrate 70A and the counter substrate 70B. The above-mentioned planar light source device 50 (refer to FIG. 1) is disposed as a backlight on the surface of the pixel substrate 70A opposite to the liquid crystal layer 70C.

The liquid crystal layer 70C modulates light passing therethrough according to the states of electric fields thereof, and uses a liquid crystal display device using liquid crystals of a horizontal electric field mode such as a fringe field switching (FFS) mode or an in-plane switching (IPS) mode. The liquid crystal layer 70C may be formed of liquid crystals of any of various modes such as a twisted nematic (TN) mode, a vertical alignment (VA) mode, and an electrically controlled birefringence (ECB) mode. An orientation film may be interposed between the liquid crystal layer 70C and the pixel substrate 70A, and between the liquid crystal layer 70C and the counter substrate 70B, which are illustrated in FIG. 7.

The counter substrate 70B includes a translucent substrate 75 and a color filter 76 formed on one surface of the translucent substrate 75. The color filter 76 includes color regions colored in four colors of, for example, red (R), green (G), blue (B), and white (W). At openings (not illustrated) of the color filter 76, the color regions colored in the four colors of, for example, red (R), green (G), blue (B), and white (W) are cyclically arranged, and one set of the color regions of four colors of R, G, B, and W is associated, as a pixel, with each of the pixels. The color filter 76 is opposed to the liquid crystal layer 70C in the direction orthogonal to a TFT substrate 71. The color filter 76 may have a combination of other colors if colored in different colors. The color filter 76 generally gives a color region of green (G) higher luminance than that of color regions of red (R) and blue (B). A black matrix may be formed so as to cover the outer circumference of the pixel. The black matrix is disposed at boundaries between two-dimensionally arranged sub-pixels so as to have a lattice shape. The black matrix is formed of material having a high rate of absorption of light. The present embodiment uses a glass substrate as the translucent substrate 75, but the material is not limited to this. A plastic substrate, for example, may be used instead of the glass substrate as the translucent substrate 75.

The pixel substrate 70A includes the TFT substrate 71 as a circuit substrate, a plurality of pixel electrodes 72 arranged in a matrix-like manner on the TFT substrate 71, a common electrode COML formed between the TFT substrate 71 and the pixel electrodes 72, and an insulation layer 74 insulating the pixel electrodes 72 from the common electrode COML. The common electrode COML is a translucent electrode formed of translucent conductive material (translucent conductive oxide) such as indium tin oxide (ITO). The present embodiment exemplifies ITO as a translucent conductive material, but the material is not limited to this. A conductive material, such as indium zinc oxide (IZO), having another composition may be used as the translucent conductive material.

Layered on the TFT substrate 71 are semiconductor layers 92 formed with thin-film transistors Tr of the above-described sub-pixels, and wires such as the data lines DTL supplying pixel signals to the pixel electrodes 72 and the scan lines SCL driving the thin-film transistors Tr with the insulation layer 74 interposed therebetween. This causes the common electrode COML to be affected by a coupling capacitance C by coupling with the data lines DTL. The present embodiment uses the TFT as a switching element of the pixel electrodes 72, but the switching element is not limited to this. Another element, such as a thin film diode, may be used instead of the TFT as the switching element of the pixel electrodes 72.

The data lines DTL extend in a plane parallel to a surface of the TFT substrate 71, and supply pixel signals for displaying an image to the pixels. One part of each of the semiconductor layers 92 contacts a data line DTL, and another part contacts a pedestal wire 90 formed in the same layer as that of the data line DTL. In the present disclosure, the scan lines SCL are first metal wires that are wires of metal such as aluminum; the data lines DTL are second metal wires that are wires of metal such as aluminum; and the pedestal wires 90 are third metal wires that are wires of metal such as aluminum. The insulation layer 74 provides insulation except at contact portions 25a where the scan lines SCL contact the semiconductor layers 92 or where the data lines DTL contact the semiconductor layers 92, and contact portions 90a (contact holes).

The semiconductor layers 92, the data lines DTL, and the scan lines SCL are formed in layers different from each other in the direction orthogonal to the surface of the TFT substrate 71 (in the Z-direction). The data lines DTL and the pedestal wires 90 are formed in the same layer in the direction orthogonal to the surface of the TFT substrate 71 (in the Z-direction).

Each of the contact portions 25a of a data line DTL is coupled to one of a source electrode and a drain electrode of a thin-film transistor Tr in a semiconductor layer 92. The semiconductor layer 92 is also coupled to a pixel electrode 72 via a pedestal wire 90. A contact portion 90a of the pedestal wire 90 is coupled to the other of the source electrode and the drain electrode of the thin-film transistor Tr in the semiconductor layer 92. As illustrated in FIG. 3, the scan lines SCL are coupled to gates of the thin-film transistors Tr in the semiconductor layers 92.

As described above, the scan lines SCL and the data lines DTL are line-like metal wires, and are arranged so as to three-dimensionally cross each other in directions substantially orthogonal to each other. As illustrated in FIG. 6, the pedestal wire 90 is disposed at an edge portion of an area surrounded in the Z-direction by a first direction (X-direction) along the scan lines SCL and a second direction (Y-direction) along the data lines DTL.

The image display panel 30 according to the present embodiment illustrated in FIG. 6 has layers in the Z-direction including the TFT substrate 71, the scan lines SCL, the semiconductor layers 92, the data lines DTL, the common electrode COML, and the pixel electrodes 72 in this order. The image display panel 30 according to the present embodiment has a bottom gate structure in which the semiconductor layers 92 are disposed in a plane between the scan lines SCL and the data lines DTL in the Z-direction. The thin-film transistors Tr have a bottom gate structure in which the scan lines SCL coupled to the gates of the thin-film transistors Tr are disposed below the semiconductor layers 92, but the structure of the thin-film transistors Tr is not limited to this. The thin-film transistors Tr may have a top gate structure in which the gates and the scan lines SCL coupled to the gates are disposed above the semiconductor layers 92.

2-2. Column Inversion Driving Method

There are known driving methods for the liquid crystal display panel such as a column inversion driving method, a line inversion driving method, a dot inversion driving method, and a frame inversion driving method. The column inversion driving method is a driving method in which voltages having polarities opposite to each other are applied to adjacent single lines (columns) of sub-pixels or of pixels composed of combinations of sub-pixels, and the polarities of the applied voltages are inverted at a predetermined period. It is known that this causes the column inversion driving method to have smaller amounts of charge and discharge in the data lines, and thus to have lower power consumption than the dot inversion driving method. Various circuits described in Japanese Examined Patent Application Publication No. H05-43118 are applicable to the signal processing unit 20.

Figure 8:
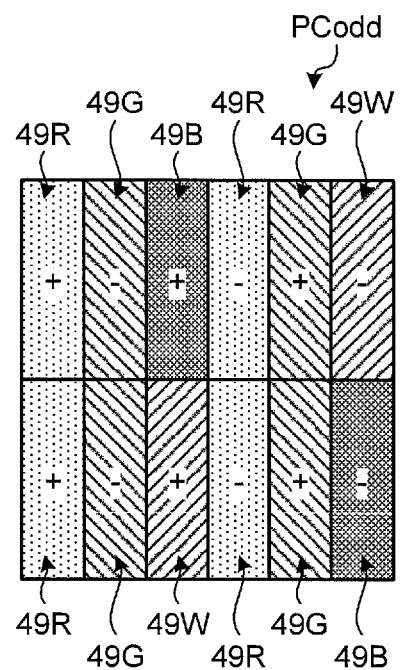
FIG. 8 is a schematic diagram for explaining a display area driven by a column inversion driving method.
Figure 9:
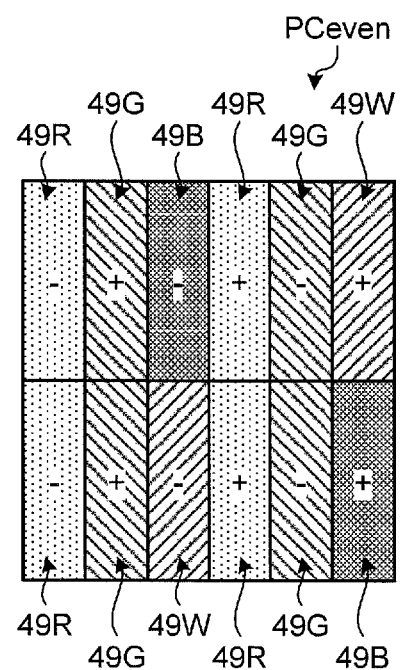
FIG. 9 is a schematic diagram for explaining the display area driven by the column inversion driving method.
Figure 10:
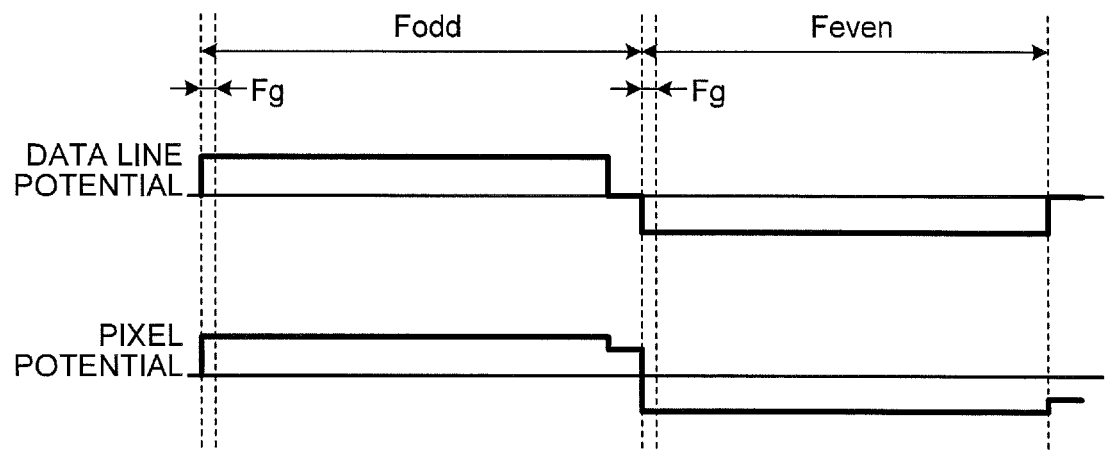
FIG. 10 is a schematic diagram for explaining a relation between data line potential and pixel potential when the column inversion driving method is applied.

FIGS. 8 and 9 are schematic diagrams for explaining a display area driven by the column inversion driving method. FIG. 10 is a schematic diagram for explaining a relation between data line potential and pixel potential when the column inversion driving method is applied. For example, assuming the potential of, for example, the common electrode as a reference potential, a potential higher than the reference potential (hereinafter called a positive (+) polarity) or a potential lower than the reference potential (hereinafter called a negative (−) polarity) is applied to each of the sub-pixels corresponding to the first sub-pixels 49R, the second sub-pixels 49G, and the third sub-pixels 49B (fourth sub-pixels 49W) arranged in the row direction so as to alternately repeat an application state PCodd illustrated in FIG. 8 and an application state PCeven illustrated in FIG. 9. Although the present embodiment assumes the reference potential to be the potential of the common electrode, the reference potential is not limited to the potential of the common electrode, but only needs to be a predetermined potential. In this manner, the column conversion method applies the voltages so that the adjacent single lines (columns) of the sub-pixels 49 have potentials different from each other with respect to the reference potential, and inverts the polarities of the applied voltages at a predetermined period. Thus, the voltages different from each other (such as having opposite polarities) are applied to adjacent data lines, and the polarities of the applied voltages are inverted at the predetermined period.

Figure 11:
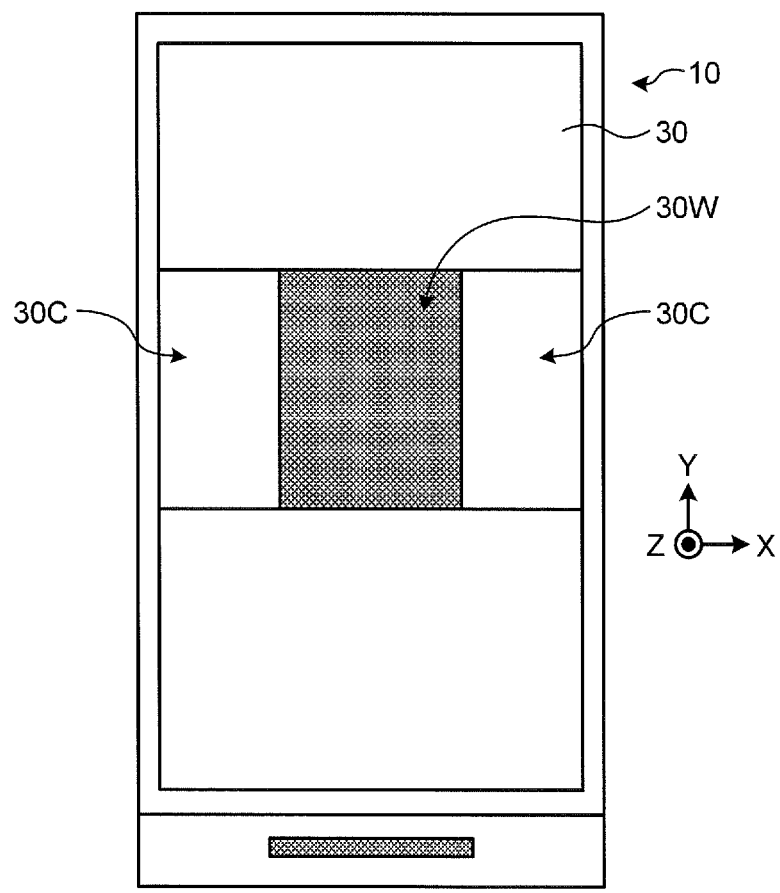
FIG. 11 is a schematic diagram for explaining crosstalk generated on an image display panel according to a comparative example.
Figure 12:
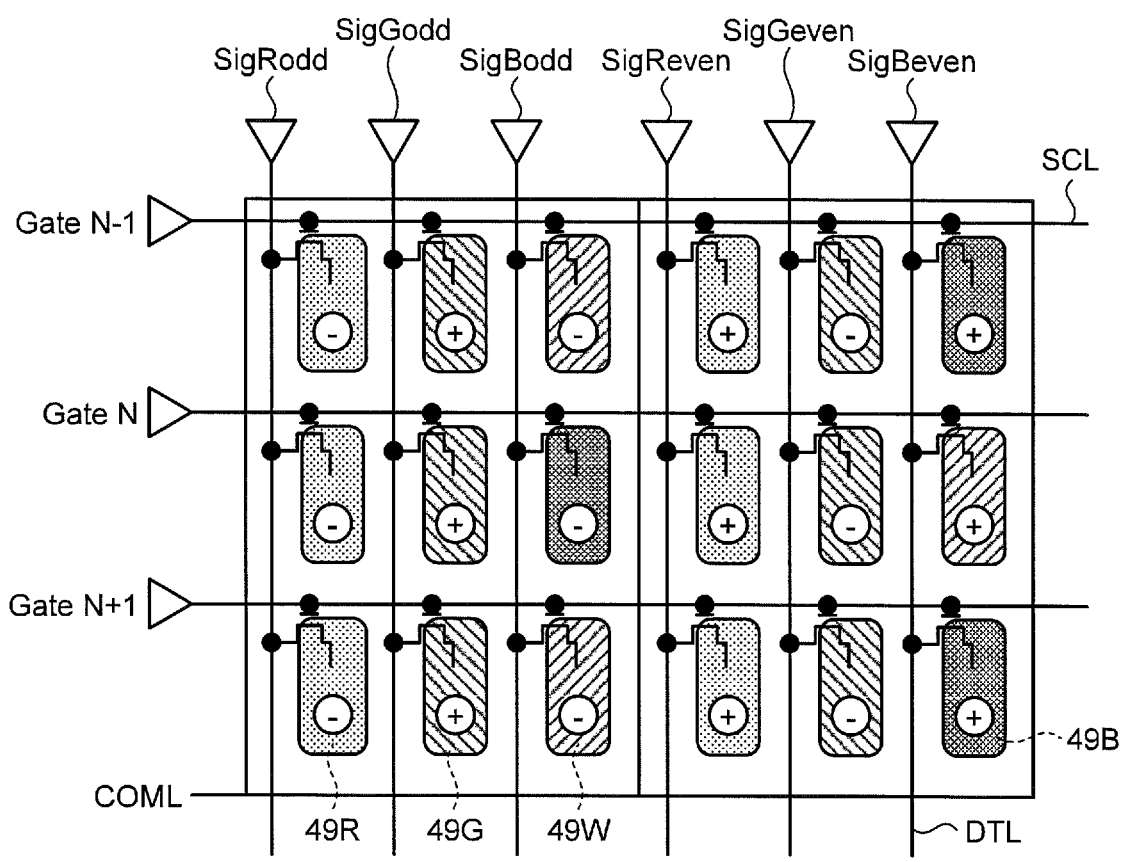
FIG. 12 is a schematic diagram illustrating a pixel array of the image display panel according to the comparative example.
Figure 13:
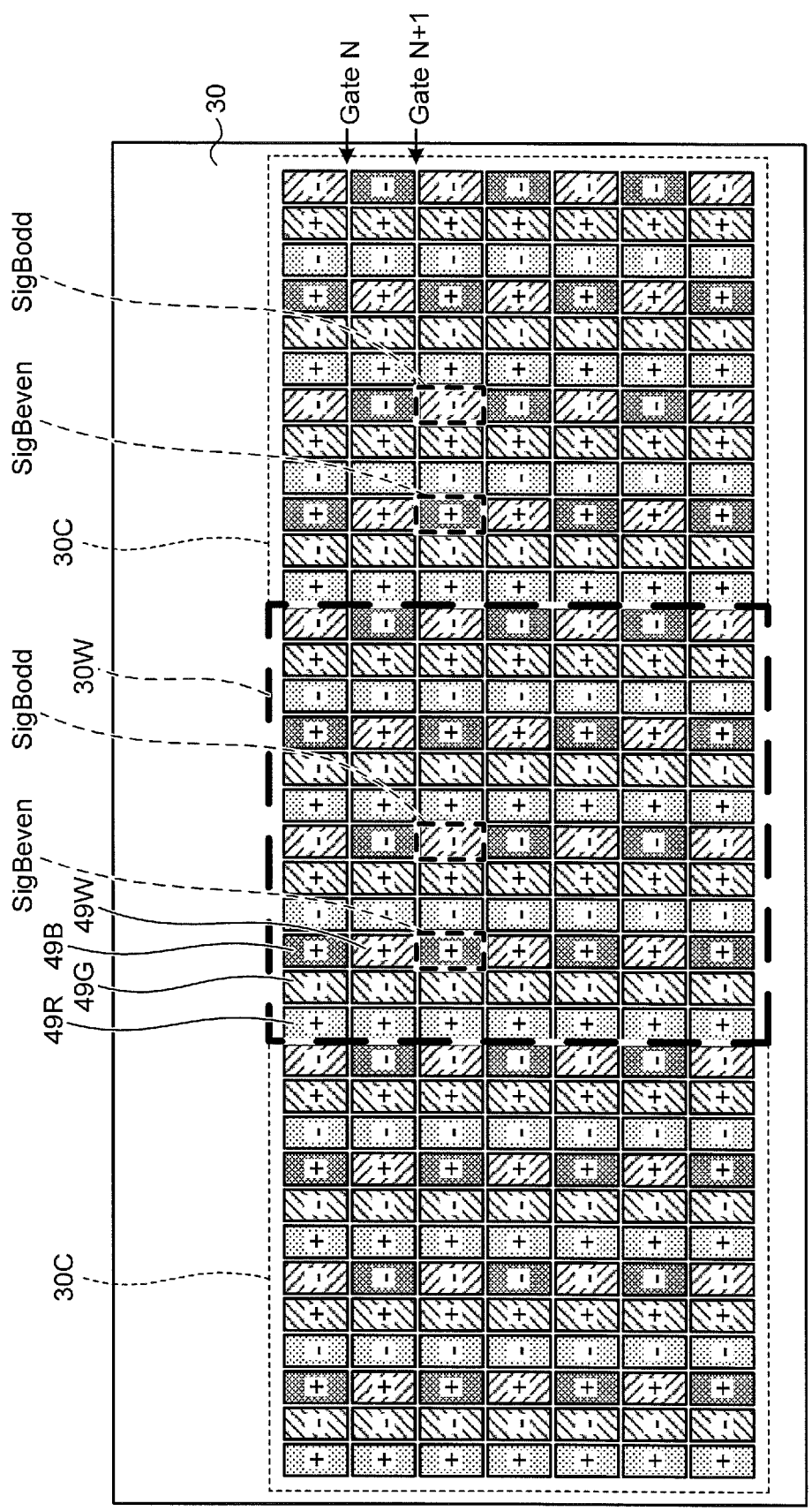
FIG. 13 is a schematic diagram for explaining a state of sub-pixels when monochromatic display is performed in the center of the image display panel according to the comparative example.
Figure 14:
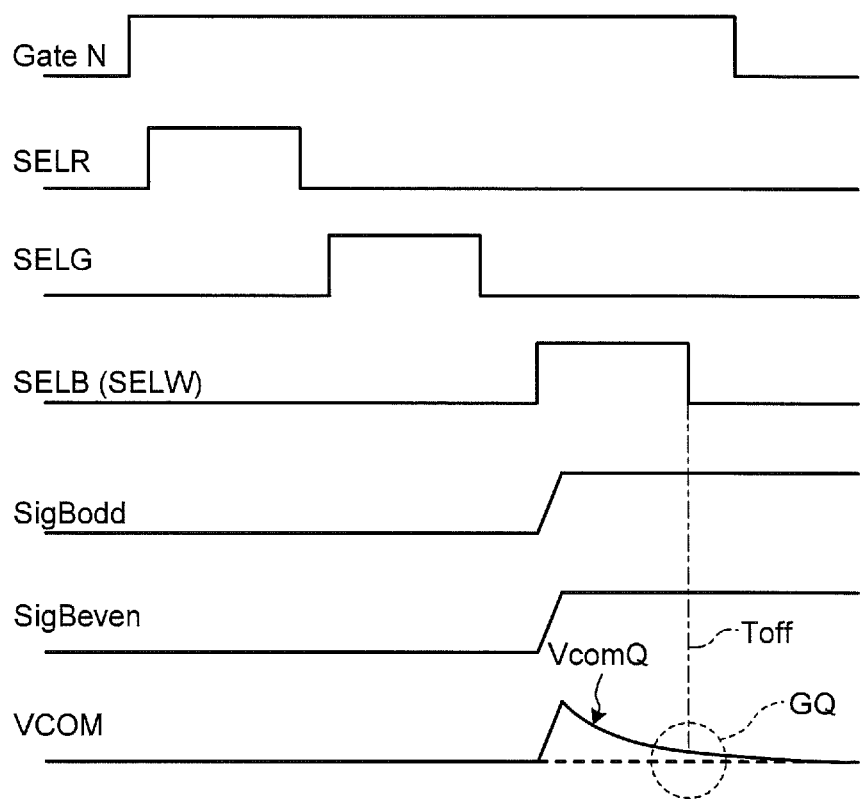
FIG. 14 is a schematic diagram for explaining waveforms of signals of a common electrode when the monochromatic display is performed in the center of the image display panel according to the comparative example.

As illustrated in FIG. 10, a period Fodd corresponding to the application state PCodd illustrated in FIG. 8 and a period Feven corresponding to the application state PCeven illustrated in FIG. 9 are alternately repeated with a writing period Fg interposed therebetween. FIG. 11 is a schematic diagram for explaining crosstalk generated on an image display panel according to a comparative example. FIG. 12 is a schematic diagram illustrating a pixel array of the image display panel according to the comparative example. FIG. 13 is a schematic diagram for explaining a state of sub-pixels when monochromatic display is performed in the center of the image display panel according to the comparative example. FIG. 14 is a schematic diagram for explaining waveforms of signals of the common electrode when the monochromatic display is performed in the center of the image display panel according to the comparative example. As illustrated in FIG. 11, the image display panel 30 displays, at the center thereof, a window image 30W in which only the third sub-pixels 49B are lit. Further, the image display panel 30 displays, on both sides of the window image 30W, neutral color display portions 30C that display, for example, neutral gray areas in which the first sub-pixels 49R, the second sub-pixels 49G, and the third sub-pixels 49B are lit, and the colors of red (R), green (G), and blue (B) have the same value. As illustrated in FIG. 10, the polarity inversion cycle of the pixel potential and the polarity inversion cycle of the data line potential substantially coincide with the period Fodd or the period Feven.

As illustrated in FIG. 12, on the image display panel according to the comparative example, the third sub-pixels 49B and the fourth sub-pixels 49W located in the same row of the third columns are coupled to the same scan line SCL. For example, as illustrated in FIGS. 12 and 13, when the scan circuit 42 selects Gate N+1 among the scan lines SCL, the sub-pixel 49B of SigBeven has a potential of positive (+) polarity, and the sub-pixel 49W in the upper row previously selected is set to 0 V because of black display. Thus, the voltage changes in the increasing (positive) direction. The sub-pixel 49W of SigBodd is set to 0 V because of black display, and the sub-pixel 49B in the upper row previously selected has a potential of negative (−) polarity. Thus, the voltage changes in the increasing (positive) direction.

As described above, the common electrode COML is affected by the coupling capacitance C by coupling with the data lines DTL. This causes, as illustrated in FIG. 14, the common electrode COML to have a potential changed in the increasing direction by being influenced by the changes in the sub-pixel 49B of SigBeven and the sub-pixel 49W of SigBodd, that is, an increase in the voltage. If a voltage VcomQ of a crosstalk component does not converge by an end time Toff of a period of the selector signal SELB of the sub-pixel 49B, a voltage gap GQ can increase the effective voltage of the fourth sub-pixel 49W, so that an image that does not normally appear may appear in the neutral color display portion 30C. It should be noted that fluctuation in the luminance of the fourth sub-pixel 49W tends to have a larger influence than that by fluctuation in the luminance of the other sub-pixels 49.

Further, when voltages having polarities opposite to each other are applied to the data lines DTL adjacent to each other, and the polarities of the applied voltages are inverted at a predetermined period, the common electrode COML has a potential changed in the increasing direction. Suppose a case in which, on the image display panel 30, the sub-pixels 49R and 49G are lit according to the selector signals SELR and SELG in conjunction with the sub-pixel 49B so that the window image 30W displays colors such as magenta and cyan. Also in that case, if the voltage VcomQ of the crosstalk component does not converge, the voltage gap GQ can increase the effective voltage of the fourth sub-pixel 49W, so that an image that does not normally appear may appear in the neutral color display portion 30C.

Figure 15:
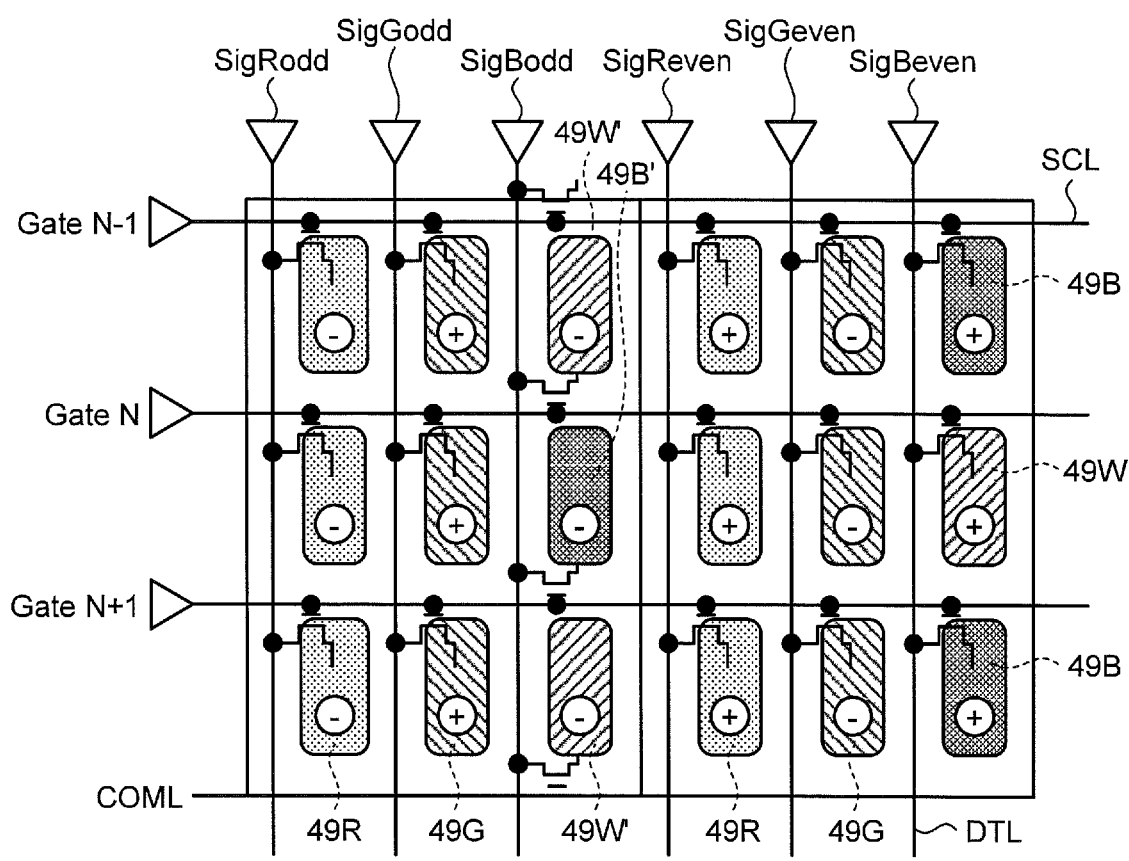
FIG. 15 is a schematic diagram illustrating the pixel array of the image display panel according to the embodiment.
Figure 16:
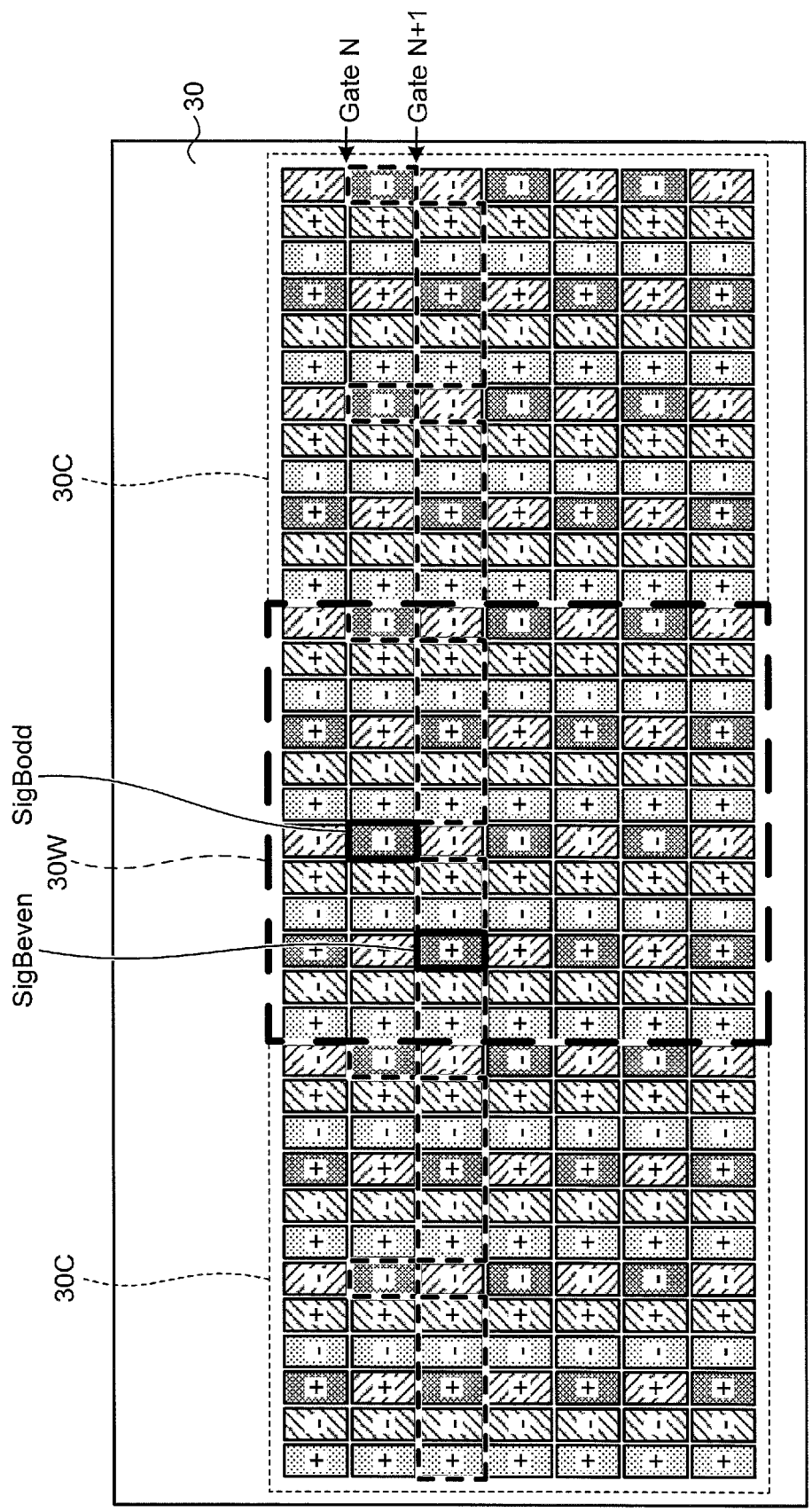
FIG. 16 is a schematic diagram for explaining a state of sub-pixels when the monochromatic display is performed in the center of the image display panel according to the embodiment.
Figure 17:
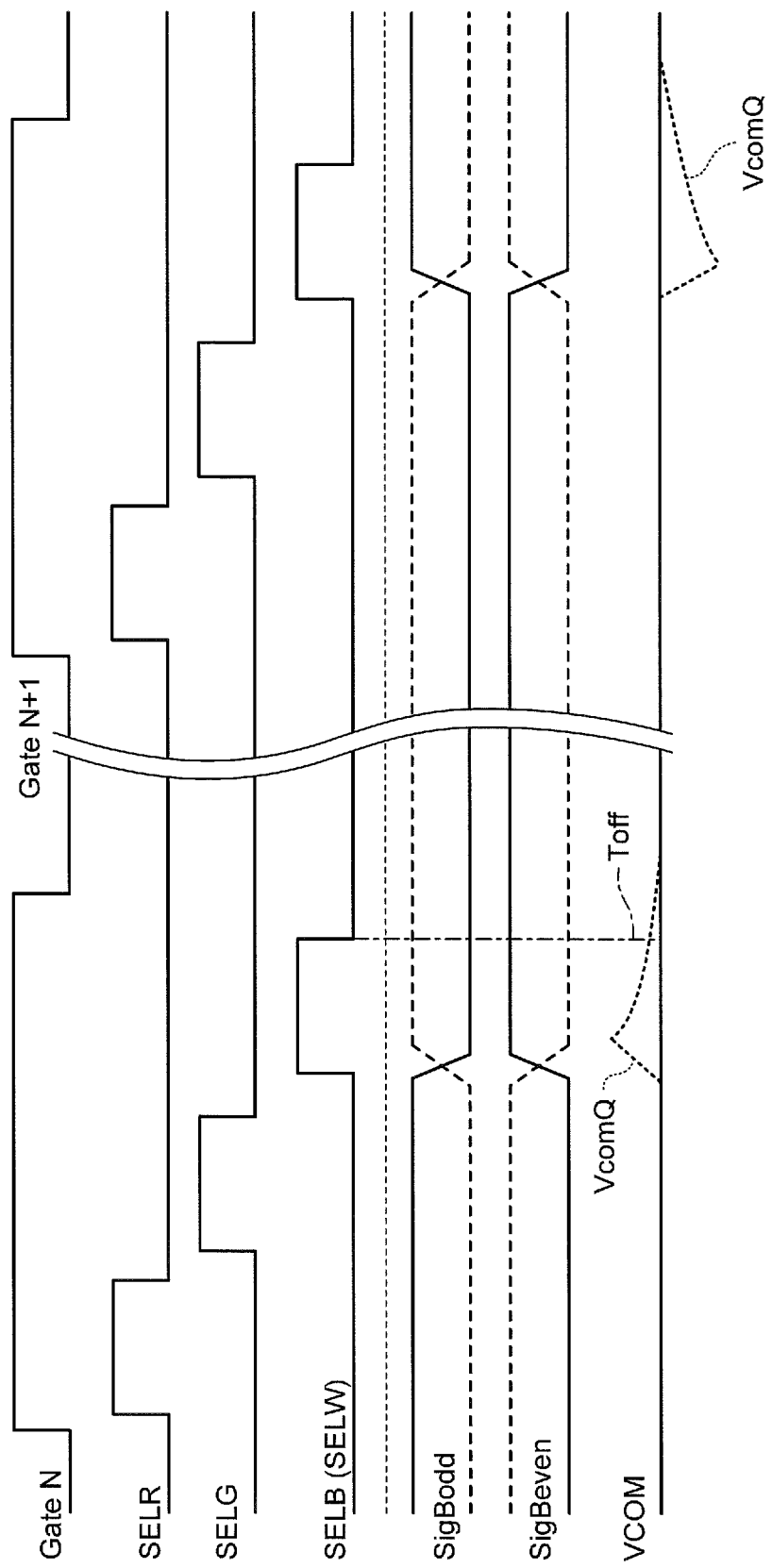
FIG. 17 is a schematic diagram for explaining waveforms of signals of a common electrode when the monochromatic display is performed in the center of the image display panel according to the embodiment.

FIG. 15 is a schematic diagram illustrating the pixel array of the image display panel according to the present embodiment. FIG. 16 is a schematic diagram for explaining a state of sub-pixels when the monochromatic display is performed in the center of the image display panel according to the present embodiment. FIG. 17 is a schematic diagram for explaining waveforms of the signals of the common electrode when the monochromatic display is performed in the center of the image display panel according to the present embodiment.

As illustrated in FIG. 15, on the image display panel 30 according to the present embodiment, the third sub-pixel 49B and the fourth sub-pixel 49W located in the same row of the third columns are not coupled to the same scan line SCL. For example, the fourth sub-pixels 49W and 49W' are coupled to the Gate N among the scan lines SCL. Thus, the scan line SCL can select the fourth sub-pixels 49W and 49W' in both of the adjacent rows. The signal processing unit 20 feeds, to the fourth sub-pixel 49W', an image signal shifted by one horizontal pixel from the first sub-pixel 49R, the second sub-pixel 49G, and the fourth sub-pixel 49W selected by Gate N among the scan lines SCL. In the same manner, the third sub-pixels 49B and 49B' are coupled to the Gate N+1 among the scan lines SCL. Thus, the scan line SCL can select the third sub-pixels 49B and 49B' in both of the adjacent rows. The signal processing unit 20 feeds, to the third sub-pixel 49B', an image signal shifted by one horizontal pixel from the first sub-pixel 49R, the second sub-pixel 49G, and the third sub-pixel 49B selected by Gate N+1 among the scan lines SCL.

For example, as illustrated in FIGS. 15 and 16, when the scan circuit 42 selects Gate N+1 among the scan lines SCL, the third sub-pixel 49B of SigBeven has a potential of positive (+) polarity, and the fourth sub-pixel 49W in the upper row previously selected is set to 0 V because of black display. Thus, the voltage changes in the increasing (positive) direction. The third sub-pixel 49B' of SigBodd has a potential of negative (−) polarity, and the fourth sub-pixel 49W' in the upper row previously selected is set to 0 V because of black display. Thus, the voltage changes in the decreasing (negative) direction. This causes, as illustrated in FIG. 17, the changes in the sub-pixel 49B of SigBeven and the third sub-pixel 49B' of the SigBodd to be cancelled each other because of negative and positive polarities, which suppresses the change in the potential of the common electrode COML.

As described above, the sub-pixels 49 in the third columns selectable by one scan line SCL are the third sub-pixels 49B and 49B'. The sub-pixels 49 in the third columns selectable by a single scan line SCL in the next row are the fourth sub-pixels 49W and 49W'. When the common electrode COML is affected by the coupling capacitance C by coupling with the data lines DTL, this structure causes the increase and decrease in the coupling capacitance to cancel each other. As a result, the display device 10 suppresses the change in the potential of the common electrode COML when the signal processing unit 20 drives the data lines DTL using the column inversion driving method.

The voltage VcomQ of the crosstalk component converges by the end time Toff of the period of the display selector SELB of the sub-pixel 49B as illustrated in FIG. 17. This can suppress the possibility that an image that does not normally appear appears in the neutral color display portion 30C. As a result, the change of the pixel potential in the effective potential per frame is little, whether the window image 30W is displayed or not. In this manner, when the driving is performed by the column inversion driving method, the display device 10 according to the present embodiment can suppress the change in the effective potential per frame of the pixel potential depending on whether the window image 30W is displayed. Further, the display device 10 can suppress the power consumption more by using the column inversion driving method than by using the dot inversion driving method. In the image display panel 30 according to the present embodiment, when the sub-pixels 49R and 49G are lit according to the selector signals SELR and SELG in conjunction with the sub-pixel 49B so that the window image 30W displays colors such as magenta and cyan, the voltage VcomQ of the crosstalk component is suppressed. This reduces the possibility that an image that does not normally appear appears in the neutral color display portion 30C.

2-3. Advantageous Effects

As described above, the display device 10 can add the white sub-pixels that are the fourth sub-pixel 49W and the fourth sub-pixel 49W' to the first sub-pixel 49R, the second sub-pixel 49G, and the third sub-pixels 49B and 49B' of red, green, and blue. This reduces the current value of the backlight because the luminance is increased by the white sub-pixels, and thereby reduces the power consumption. Further, the display device 10 performs driving by the column inversion driving method. This suppresses charge and discharge in each of the data lines DTL, and thereby further reduces the power consumption.

The image display panel 30 has the arrangement in which the three columns of the first sub-pixels 49R, the second sub-pixels 49G, and the third sub-pixels 49B are juxtaposed in sequence, and in the third columns, the third sub-pixels 49B and the fourth sub-pixels 49W are alternately arranged in the row direction. As a result, an increase in the size of the pixel area can be suppressed even when the fourth sub-pixels 49W are added, thereby achieving high definition. The signal processing unit 20 performs driving by column inversion driving method so that voltages having polarities opposite to each other are applied to the data lines DTL adjacent to each other, and the polarities of the applied voltages are inverted at a predetermined period. This allows the display device 10 to suppress the power consumption. The display device 10 can also suppress what is called crosstalk that reduces (deteriorates) display quality.

3. Modifications

3-1. First Modification

Figure 18:
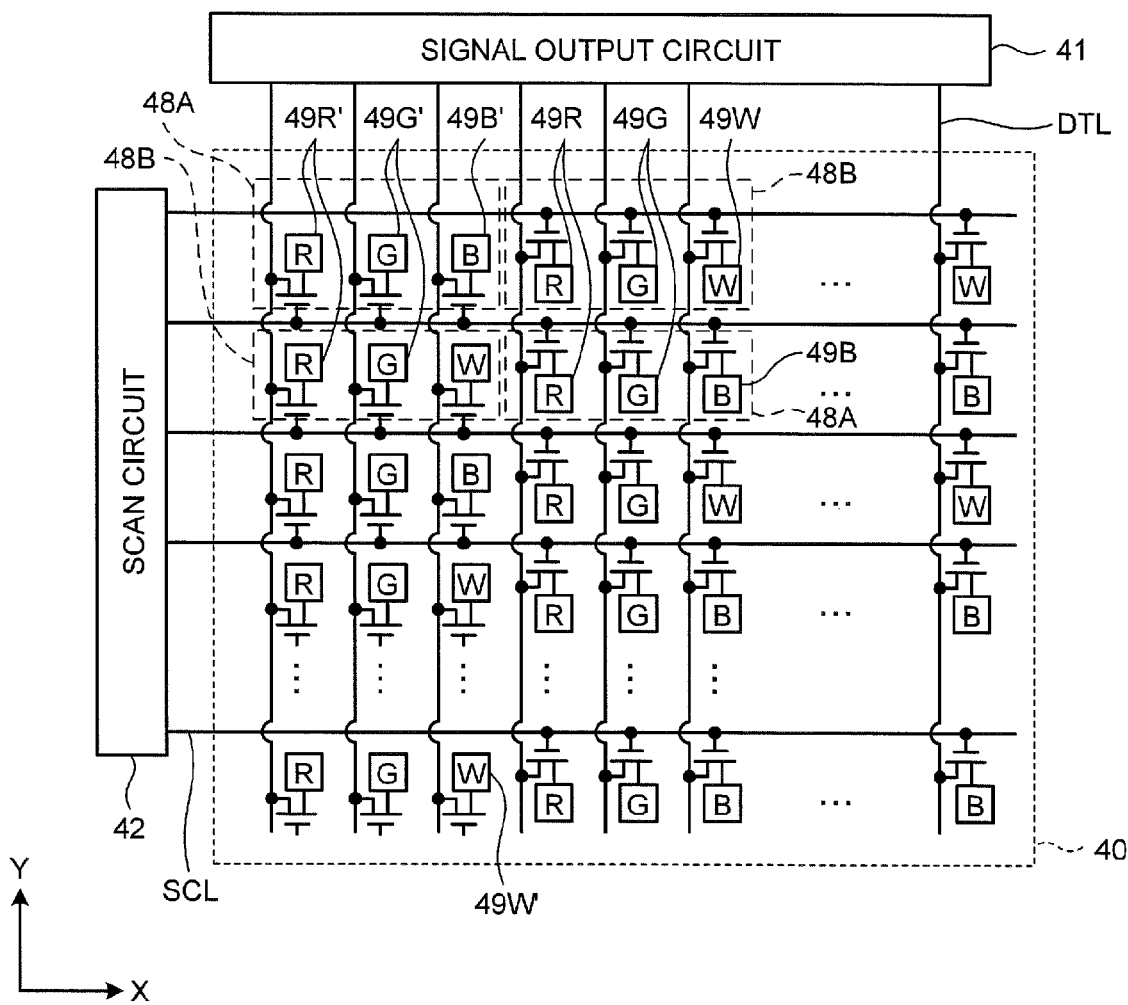
FIG. 18 is a conceptual diagram of an image display panel and an image display panel drive circuit of a display device according to a first modification of the embodiment.

FIG. 18 is a conceptual diagram of an image display panel and an image display panel drive circuit of a display device according to a first modification of the present embodiment. In the display device according to the first modification of the present embodiment, a scan line SCL coupled to sub-pixels 49R', 49G', 49B', 49R, 49G, and 49B, and a scan line SCL coupled to sub-pixels 49R', 49G', 49W', 49R, 49G, and 49W are alternately arranged with pixels 48A and 48B in the same row interposed therebetween. The sub-pixels 49 in the third columns and adjacent to each other in the direction along the row direction are arranged so that the third sub-pixels 49B' and the fourth sub-pixels 49W are alternately arranged in the same row of the third columns. Otherwise, the sub-pixels 49 in the third columns and adjacent to each other in the direction along the row direction are arranged so that the third sub-pixels 49B and the fourth sub-pixels 49W' are alternately arranged in the same row of the third columns. The third sub-pixels 49B' and the fourth sub-pixels 49W in the same row of the third columns are alternately coupled to different lines of the scan lines SCL. The third sub-pixels 49B and the fourth sub-pixels 49W' in the same row of the third columns are alternately coupled to different lines of the scan lines SCL. As a result, the sub-pixels 49 in the third columns selected by one of the scan lines SCL are the third sub-pixels 49B and the third sub-pixels 49B'. Otherwise, the sub-pixels 49 in the third columns selected by one of the scan lines SCL are the fourth sub-pixels 49W and the fourth sub-pixels 49W'. The display device according to the first modification of the present embodiment can add the fourth sub-pixels 49W and 49W' serving as white sub-pixels to the first sub-pixels 49R and 49R', the second sub-pixels 49G and 49G', and the third sub-pixels 49B and 49B' of red, green, and blue. This reduces the current value of the backlight because the luminance is increased by the white sub-pixels, and thereby reduces the power consumption. Further, the display device 10 performs driving by the column inversion driving method. This suppresses charge and discharge in each of the data lines DTL, and thereby further reduces the power consumption.

The image display panel 30 has an arrangement in which three columns of the first sub-pixels 49R, the second sub-pixels 49G, and the third sub-pixels 49B, and three columns of the first sub-pixels 49R', the second sub-pixels 49G', and the third sub-pixels 49B' are juxtaposed in sequence. In the third columns, the third sub-pixels 49B and the fourth sub-pixels 49W' are alternately arranged in the direction along the column direction, and the third sub-pixels 49B' and the fourth sub-pixels 49W are alternately arranged in the direction along the column direction. As a result, an increase in the size of the pixel area can be suppressed even when the fourth sub-pixels 49W and 49W' are added, thereby achieving high definition. The signal processing unit 20 performs driving by column inversion driving method so that voltages having polarities opposite to each other are applied to the data lines DTL adjacent to each other, and the polarities of the applied voltages are inverted at a predetermined period. This allows the display device 10 to suppression of the power consumption. The display device 10 can also suppress what is called crosstalk that reduces (deteriorates) display quality.

3-2. Second Modification

Figure 19:
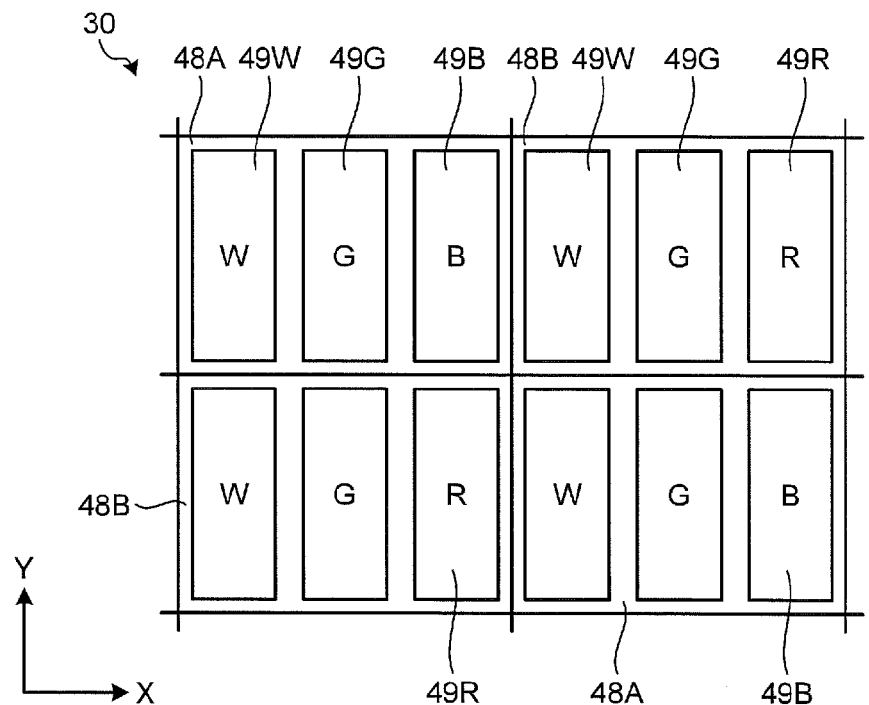
FIG. 19 is a diagram illustrating a pixel array of an image display panel according to a second modification of the embodiment.

FIG. 19 is a diagram illustrating a pixel array of an image display panel according to a second modification of the present embodiment. In pixels 48A and pixels 48B of this image display panel 30, a first column includes white first sub-pixels 49W arranged therealong; a second column is arranged as a column next to the corresponding first column and includes green second sub-pixels 49G arranged therealong; and a third column is arranged between the first column and the second column. The first, second, and third columns are iteratively arranged. In third columns, blue third sub-pixels 49B and red fourth sub-pixels 49R are alternately arranged in the row direction. Further, in the same columns of the third columns, the third sub-pixels 49B and the fourth sub-pixels 49R are alternately arranged in the column direction. Such an arrangement increases the luminance of the white first sub-pixels 49W, thus allowing the image display panel to be brighter.

3-3. Third Modification

Figure 20:
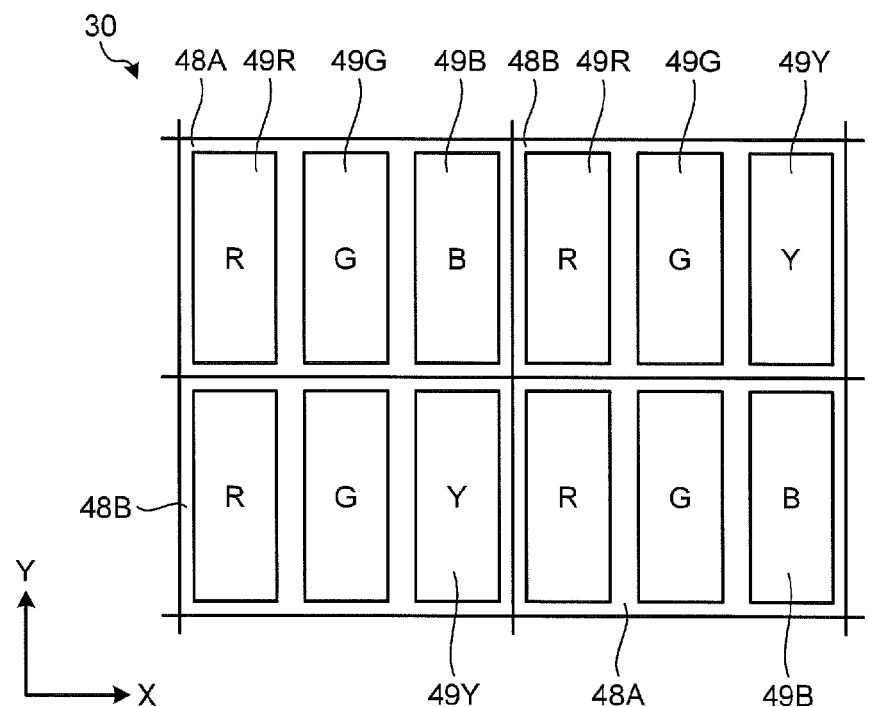
FIG. 20 is a diagram illustrating a pixel array of an image display panel according to a third modification of the embodiment.

FIG. 20 is a diagram illustrating a pixel array of an image display panel according to a third modification of the present embodiment. In pixels 48A and pixels 48B of this image display panel 30, a first column includes red first sub-pixels 49R arranged therealong; a second column is arranged as a column next to the corresponding first column and includes green second sub-pixels 49G arranged therealong; and a third column is arranged as a column next to the corresponding second column. The first, second, and third columns are iteratively arranged. In third columns, blue third sub-pixels 49B and yellow fourth sub-pixels 49Y are alternately arranged in the row direction. Further, in the same columns of the third columns, the third sub-pixels 49B and the fourth sub-pixels 49Y are alternately arranged in the column direction. A yellow color filter, for example, is disposed between a fourth sub-pixel 49Y and the image observer. Such an arrangement allows the image display panel to have a wider color representation range.

3-4. Fourth Modification

Figure 21:
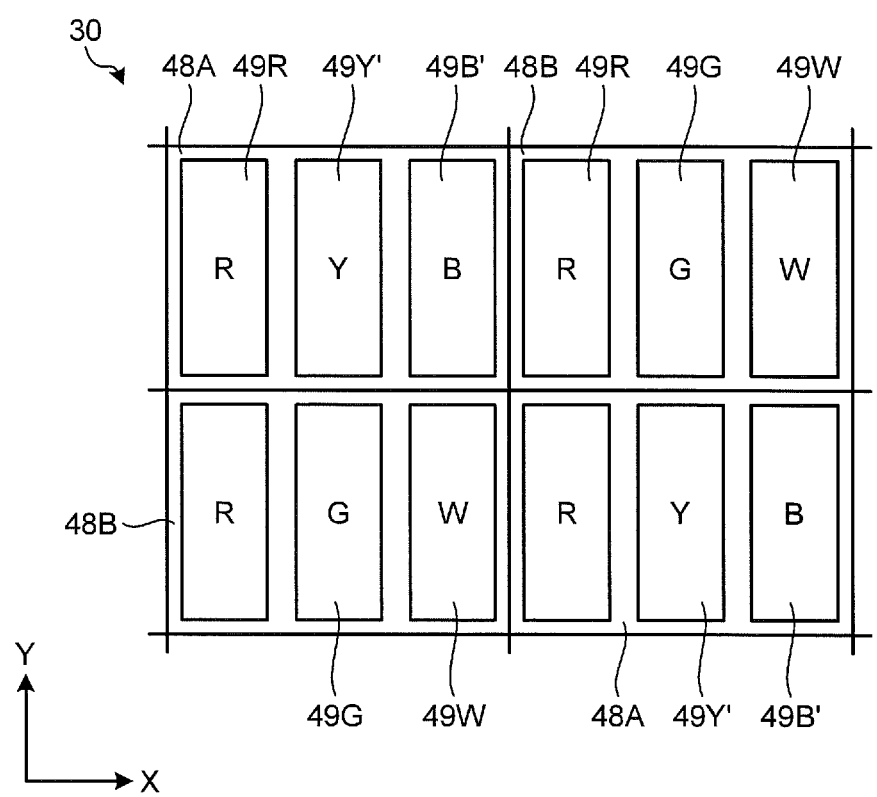
FIG. 21 is a diagram illustrating a pixel array of an image display panel according to a fourth modification of the embodiment.
Figure 22:
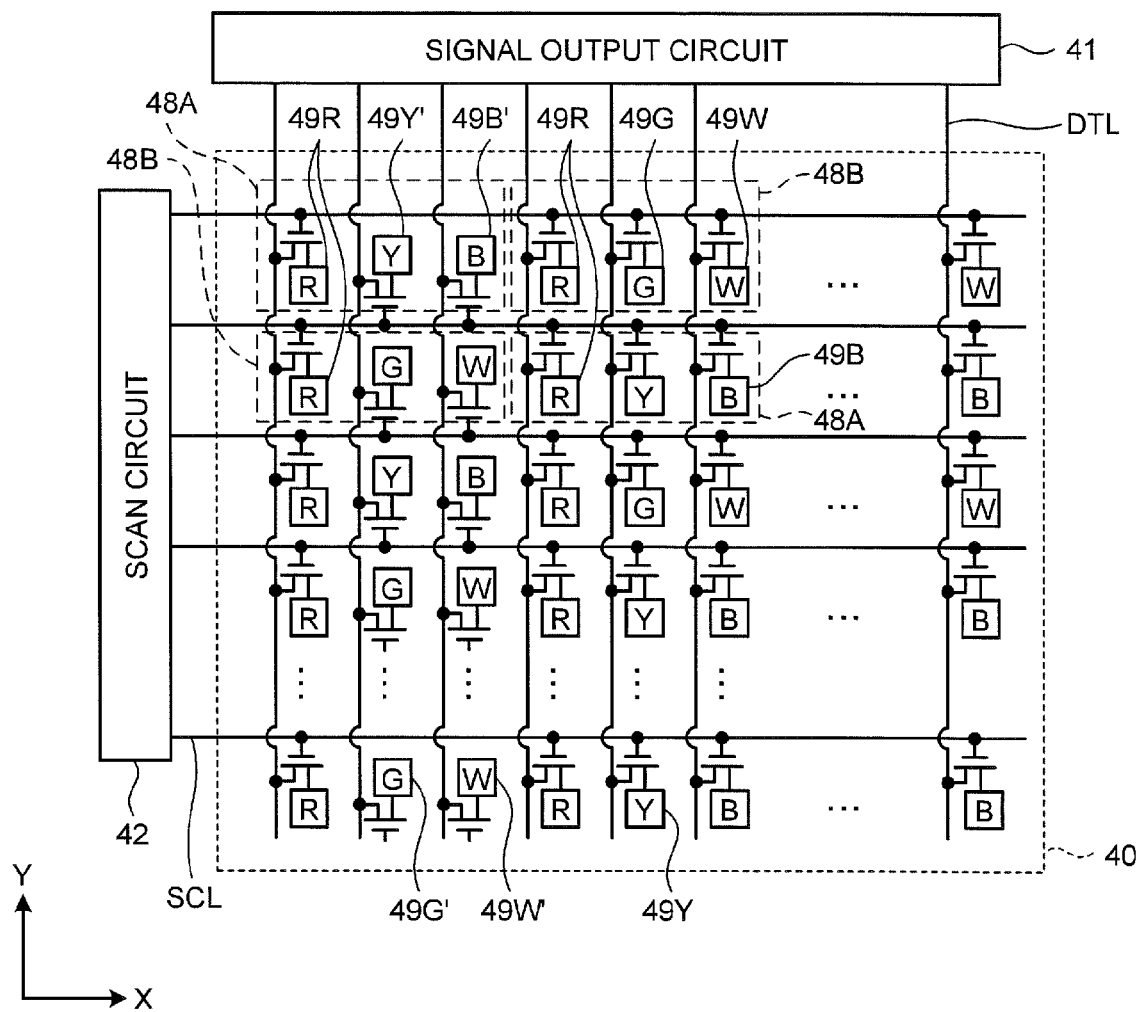
FIG. 22 is a conceptual diagram of the image display panel and an image display panel drive circuit of the display device according to the fourth modification of the embodiment.

FIG. 21 is a diagram illustrating a pixel array of an image display panel according to a fourth modification of the present embodiment. FIG. 22 is a conceptual diagram of the image display panel and an image display panel drive circuit of the display device according to the fourth modification of the present embodiment. In pixels 48A and pixels 48B of this image display panel 30, a first column includes red first sub-pixels 49R; a second column is arranged as a column next to the corresponding first column; a third column is arranged as a column next to the corresponding second column. The first, second, and third columns are cyclically arranged in an iterative manner. In the third columns, blue third sub-pixels 49B and white fourth sub-pixels 49W are alternately arranged in the row direction. Further, in the same columns of the third columns, the third sub-pixels 49B and the fourth sub-pixels 49W are alternately arranged in the column direction. In the second columns, green second sub-pixels 49G and yellow fifth sub-pixels 49Y are alternately arranged in the row direction. Further, in the same columns of the second columns, the second sub-pixels 49G and the fifth sub-pixels 49Y are alternately arranged in the column direction. A yellow color filter, for example, is disposed between a fifth sub-pixel 49Y and the image observer. Such an arrangement allows the image display panel to have a wider color representation range.

In the display device according to the fourth modification of the present embodiment, third sub-pixels 49B' and the fourth sub-pixels 49W in the same row of the third columns are alternately coupled to different lines of the scan lines SCL. The third sub-pixels 49B and fourth sub-pixels 49W' in the same row of the third columns are alternately coupled to different lines of the scan lines SCL. As a result, the sub-pixels 49 in the third columns selected by one of the scan lines SCL are the third sub-pixels 49B and the third sub-pixels 49B'. Otherwise, the sub-pixels 49 in the third columns selected by one of the scan lines SCL are the fourth sub-pixels 49W and the fourth sub-pixels 49W'. Second sub-pixels 49G' and the fifth sub-pixels 49Y in the same row of the second columns are alternately coupled to different lines of the scan lines SCL. The second sub-pixels 49G and fifth sub-pixels 49Y' in the same row of the second columns are alternately coupled to different lines of the scan lines SCL. As a result, the sub-pixels 49 in the second columns selected by one of the scan lines SCL are the second sub-pixels 49G and the second sub-pixels 49G'. Otherwise, the sub-pixels 49 in the second columns selected by one of the scan lines SCL are the fifth sub-pixels 49Y and the fifth sub-pixel 49Y'. The display device according to the fourth modification of the present embodiment can add the fourth sub-pixels 49W and 49W' serving as white sub-pixels to the first sub-pixels 49R, the second sub-pixels 49G and 49G', and the third sub-pixels 49B and 49B' of red, green, and blue. This reduces the current value of the backlight because the luminance is increased by the white sub-pixels, and thereby reduces the power consumption. The display device according to the fourth modification of the present embodiment can also add the fifth sub-pixels 49Y and 49Y' serving as yellow pixels to the first sub-pixels 49R, the second sub-pixels 49G and 49G', and the third sub-pixels 49B and 49B' of red, green, and blue. Such an arrangement allows the image display panel to have a wider color representation range. Further, the display device 10 performs the drive by the column inversion driving method. This suppresses charge and discharge in each of the data lines DTL, and thereby further reduces the power consumption.

The image display panel 30 has an arrangement in which three columns of the first sub-pixels 49R, the second sub-pixels 49G, and the third sub-pixels 49B, and three columns of the first sub-pixels 49R, the second sub-pixels 49G', and the third sub-pixels 49B' are cyclically juxtaposed in sequence. As a result, an increase in the size of the pixel area can be suppressed even when the fourth sub-pixels 49W and 49W' and the fifth sub-pixels 49Y and 49Y' are added, thereby allowing the display panel to be high definition and to have a wide color representation range. The signal processing unit 20 performs driving by the column inversion driving method so that voltages having polarities opposite to each other are applied to the data lines DTL adjacent to each other, and the polarities of the applied voltages are inverted at a predetermined period. This allows the display device 10 to suppress the power consumption. The display device 10 can also suppress what is called crosstalk that reduces (deteriorates) display quality.

3-5. Fifth Modification

Figure 23:
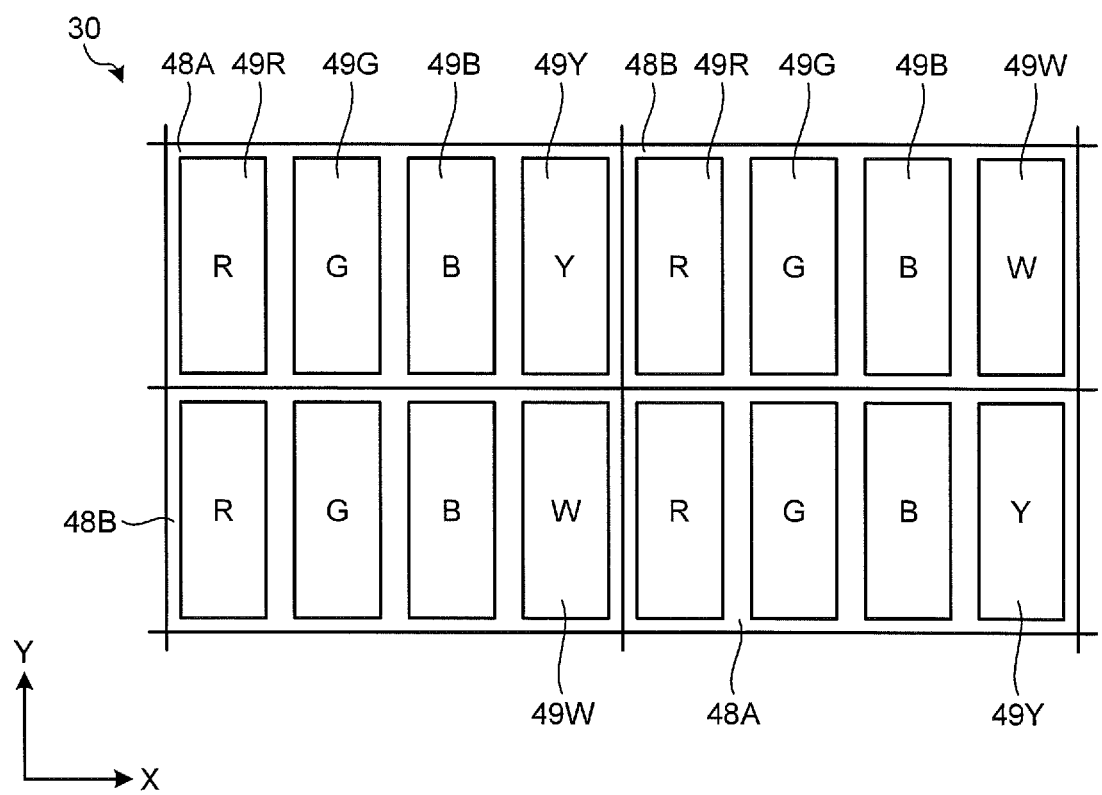
FIG. 23 is a diagram illustrating a pixel array of an image display panel according to a fifth modification of the embodiment.
Figure 24:
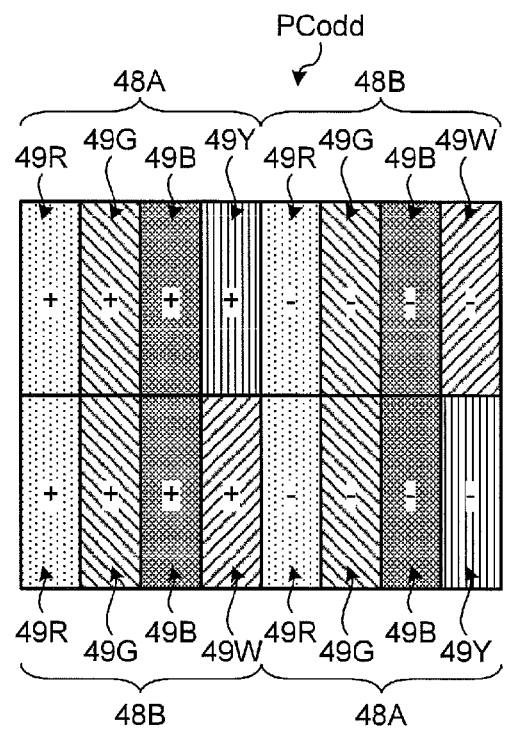
FIG. 24 is a schematic diagram for explaining a display area driven by the column inversion driving method according to the fifth modification of the embodiment.
Figure 25:
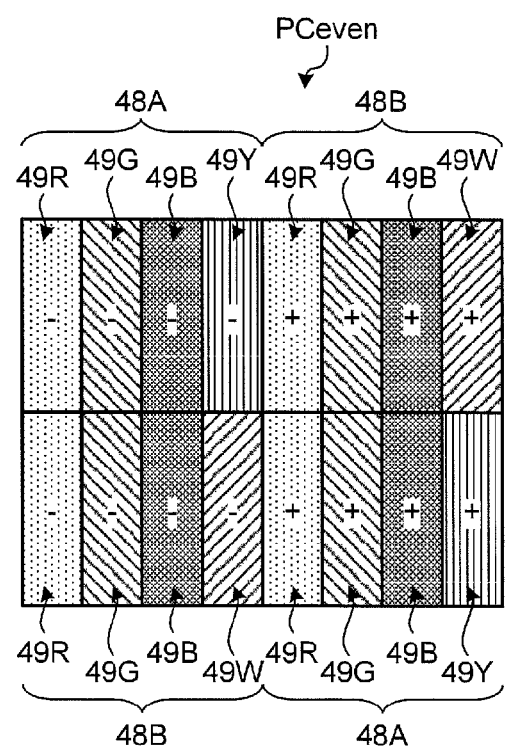
FIG. 25 is a schematic diagram for explaining the display area driven by the column inversion driving method according to the fifth modification of the embodiment.

FIG. 23 is a diagram illustrating a pixel array of an image display panel according to a fifth modification of the present embodiment. FIG. 24 is a schematic diagram for explaining a display area driven by the column inversion driving method according to the fifth modification of the present embodiment. FIG. 25 is a schematic diagram for explaining the display area driven by the column inversion driving method according to the fifth modification of the present embodiment. In pixels 48A and pixels 48B of this image display panel 30, a fourth column includes red fifth sub-pixels 49R, a first column is arranged as a column next to the corresponding fourth column and includes green second sub-pixels 49G; a second column is arranged as a column next to the corresponding first column and includes blue second sub-pixels 49B; and a third column is arranged as a column next to the corresponding second column. The fourth, first, second, and third columns are cyclically arranged in an iterative manner. In the third columns, yellow third sub-pixels 49Y and white fourth sub-pixels 49W are alternately arranged in the row direction. Further, in the same columns of the third columns, the third sub-pixels 49Y and the fourth sub-pixels 49W are alternately arranged in the column direction. A yellow color filter, for example, is disposed between a third sub-pixel 49Y and the image observer. Such an arrangement allows the image display panel to have a wider color representation range.

FIGS. 24 and 25 are the schematic diagrams for explaining the display area driven by the column inversion driving method according to the fifth modification of the present embodiment. For example, a potential having a positive (+) polarity or a potential having a negative (−) polarity is applied to each of the pixels 48A and the pixels 48B corresponding to the first to the fourth columns arranged in the row direction so as to alternately repeat the application state PCodd illustrated in FIG. 24 and the application state PCeven illustrated in FIG. 25. The pixels 48A and the pixels 48B are alternately arranged to form a single column. Voltages having polarities opposite to each other are applied to single columns of the pixels 48 adjacent to each other, and the polarities of the applied voltages are inverted at a predetermined period. In this manner, the column conversion method applies the voltages so that the adjacent single lines (columns) of the pixels formed by combining the sub-pixels 49 have potentials different from each other with respect to the reference potential, and inverts the polarities of the applied voltages at a predetermined period.

The image display panel 30 has the arrangement in which the four columns of the fifth sub-pixels 49R, the first sub-pixels 49G, the second sub-pixels 49B, and the third sub-pixels 49Y are juxtaposed in sequence, and in the third columns, the third sub-pixels 49Y and the fourth sub-pixels 49W are alternately arranged in the row direction. As a result, an increase in the size of the pixel area can be suppressed even when the fourth sub-pixels 49W are added, thereby achieving high definition. The signal processing unit 20 performs driving by the column inversion driving method so that voltages having polarities opposite to each other are applied to a pixel 48A and a pixel 48B adjacent to each other, and the polarities of the applied voltages are inverted at a predetermined period. This allows the display device 10 to suppress the power consumption. The display device 10 can also suppress what is called crosstalk that reduces (deteriorates) display quality.

3-6. Display Device Including Touch Detection Device

Figure 26:
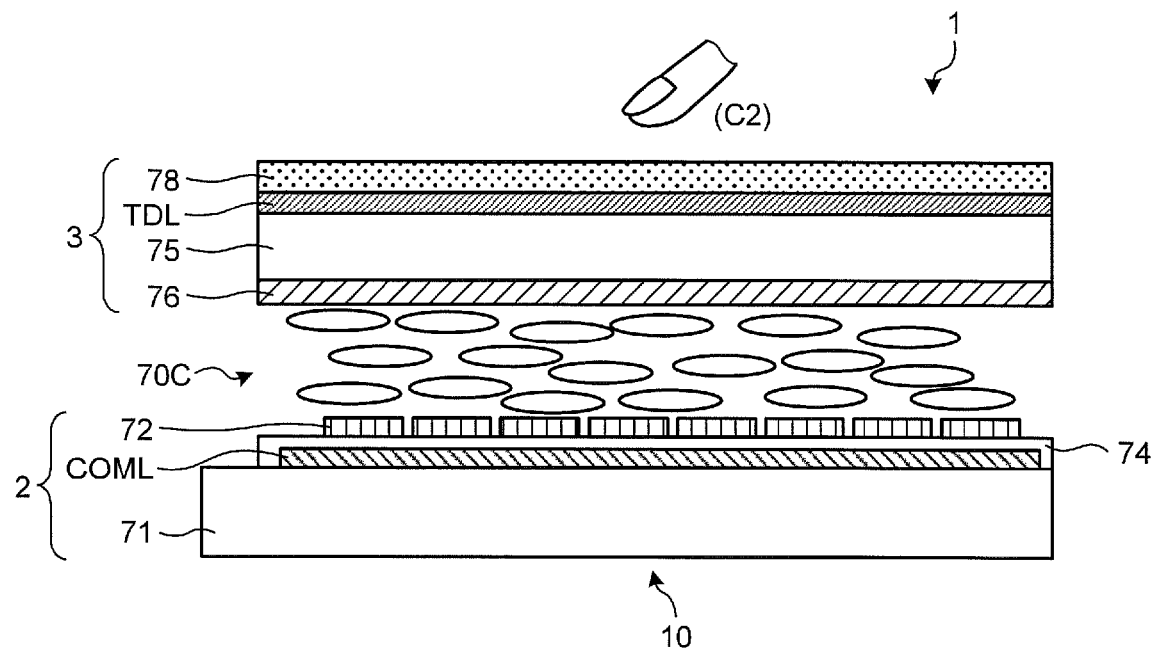
FIG. 26 is a conceptual diagram of a display device according to the embodiment in which a touch detection device is integrated onto the image display panel.

FIG. 26 is a conceptual diagram of a display device according to the present embodiment in which a touch detection device is integrated onto the image display panel. As illustrated in FIG. 26, this display device 10 includes a pixel substrate 2, a counter substrate 3 disposed so as to be opposed in the orthogonal direction to a surface of the pixel substrate 2, and the liquid crystal layer 70C provided between the pixel substrate 2 and the counter substrate 3.

The liquid crystal layer 70C modulates light passing therethrough according to states of electric field thereof, and uses a liquid crystal display device using liquid crystals of the horizontal electric field mode such as the FFS mode or the IPS mode. An orientation film may be interposed between the liquid crystal layer 70C and the pixel substrate 2, and between the liquid crystal layer 70C and the counter substrate 3, which are illustrated in FIG. 26.

The counter substrate 3 includes the translucent substrate 75 and the color filter 76 formed on one surface of the translucent substrate 75. The other surface of the translucent substrate 75 is formed with touch detection electrodes TDL that are detection electrodes of this touch detection device 1, and a polarizing plate 78 is further provided on top of the touch detection electrodes TDL.

The pixel substrate 2 includes the TFT substrate 71 as a circuit substrate, the pixel electrodes 72 arranged in a matrix-like manner on the TFT substrate 71, a plurality of common electrodes COML formed between the TFT substrate 71 and the pixel electrodes 72, and the insulation layer 74 insulating the pixel electrodes 72 from the common electrodes COML. The common electrodes COML are opposed to the pixel electrodes 72 in the direction orthogonal to a surface of the TFT substrate 71. With this, the common electrodes COML and the touch detection electrodes TDL provided on the counter substrate 3 constitute the touch detection device. The touch detection electrodes TDL are composed of stripe-like electrode patterns that extend in the direction intersecting the extending direction of electrode patterns of the common electrodes COML. The touch detection electrodes TDL are opposed to the common electrodes COML in the direction orthogonal to the surface of the TFT substrate 71. Each of the electrode patterns of the touch detection electrodes TDL is coupled to an input of a touch detection unit (not illustrated). The electrode patterns intersecting each other provided by the common electrodes COML and the touch detection electrodes TDL generate electrostatic capacitance at intersecting portions therebetween.

With this configuration, when the touch detection device 1 performs a touch detection operation of detecting a nearby object, the image display panel drive circuit 40 performs driving, as a control device, so as to line-sequentially scan the common electrodes COML block by block in a time-divisional manner. This operation sequentially selects one detection block of the common electrodes COML in the scan direction. In a state (contact state) in which a finger contacts (or comes close) as the nearby object, an electrostatic capacitance C2 formed by the finger changes the electrostatic capacitance acting at the intersecting portions between the common electrodes COML and the touch detection electrodes TDL. The touch detection device 1 outputs the changed electrostatic capacitance as a touch detection signal from the touch detection electrodes TDL. In this manner, the touch detection device 1 performs the touch detection one detection block by one detection block.

Figure 27:
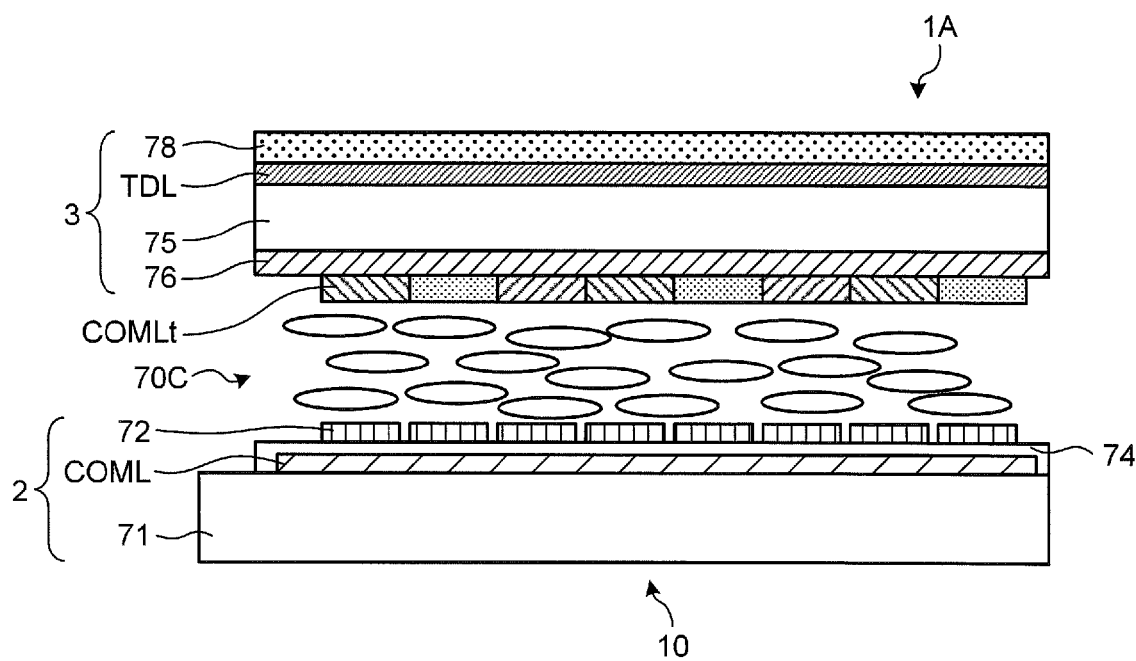
FIG. 27 is a conceptual diagram of a display device according to the embodiment in which a touch detection device is attached on top of the image display panel.

FIG. 27 is a conceptual diagram of a display device according to the present embodiment in which a touch detection device is attached onto the image display panel. The same constituent elements as those described above will be given the same numerals, and duplicate description thereof will not be repeated. This display device 10 includes drive electrodes COMLt separately from the common electrodes COML. This causes the common electrode COML to serve as a common electrode of the display device 10, and the drive electrodes COMLt to serve as drive electrodes of a touch detection device 1A. The display device 10 is a device having the touch detection device 1A of an electrostatic capacitance type that is attached on top of the image display panel.

Figure 28:
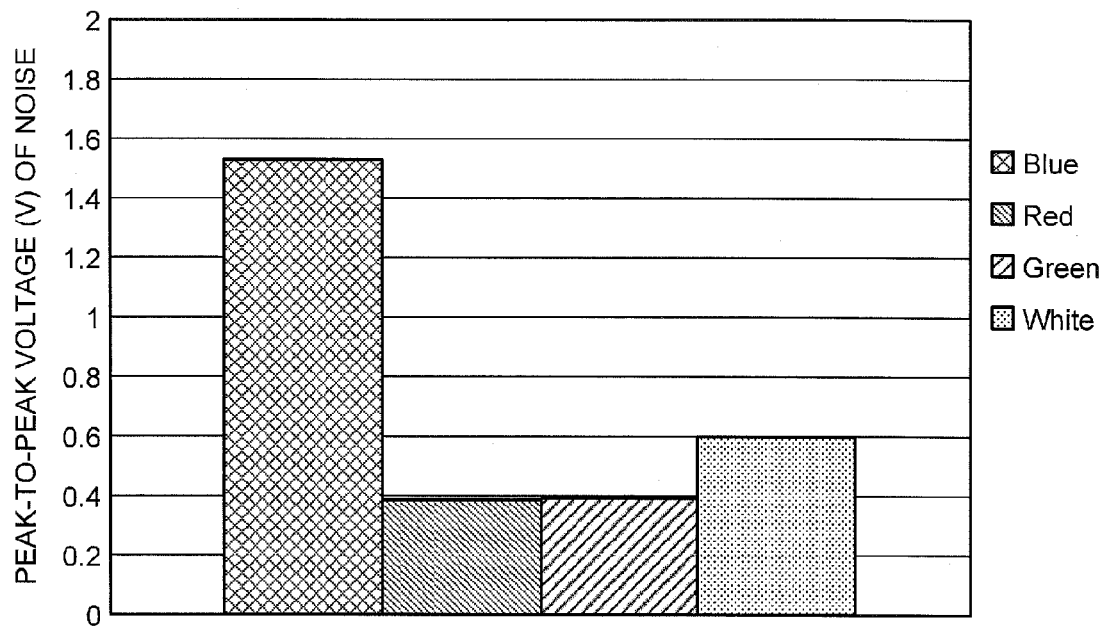
FIG. 28 is an explanatory diagram explaining an example of noise given to the touch detection device by the display device according to the comparative example illustrated in FIG. 12.

FIG. 28 is an explanatory diagram explaining an example of noise given to the touch detection device by the display device according to the comparative example illustrated in FIG. 12. The vertical axis illustrated in FIG. 28 represents an example of peak-to-peak voltage (V) of the noise given to the touch detection electrodes TDL by a panel surface when the electrostatic capacitance type touch detection device 1A illustrated in FIG. 27 is attached on top of the image display panel. The bar Blue illustrated in FIG. 28 represents the electrostatic capacitance acting on the touch detection electrodes TDL when only the sub-pixels 49B are lit. The bar Red illustrated in FIG. 28 represents the electrostatic capacitance acting on the touch detection electrodes TDL when only the sub-pixels 49R are lit. The bar Green illustrated in FIG. 28 represents the electrostatic capacitance acting on the touch detection electrodes TDL when only the sub-pixels 49G are lit. The bar White illustrated in FIG. 28 represents the electrostatic capacitance acting on the touch detection electrodes TDL when only the sub-pixels 49W are lit.

The bars Blue and White illustrated in FIG. 28 indicate higher noise levels than those of Red and Green. The reason for the increase in the noise is considered that the potential of the common electrode COML fluctuates due to, for example, an influence of the above-described voltage VcomQ of the crosstalk component illustrated in FIG. 14. As described above, the image display panel 30 according to the present embodiment stabilizes the potential of the common electrode COML, and reduces the electrostatic capacitance acting on the touch detection electrodes TDL. As a result, the display device 10 according to the present embodiment can reduce the noise given to the touch detection device 1A.

4. Application Examples

A description will be made of application examples of the present disclosure in which the above-described display device 10 is applied to an electronic apparatus.

FIGS. 29 to 41 are diagrams each illustrating an example of the electronic apparatus including the display device according to the present embodiment. The display device 10 can be applied to electronic apparatuses of all fields such as television devices, digital cameras, notebook type personal computers, mobile terminal devices including mobile phones, and video cameras. In other words, the display device 10 can be applied to electronic apparatuses of all fields that display externally received video signals or internally generated video signals as images or video pictures.

4-1. Application Example 1

Figure 29:
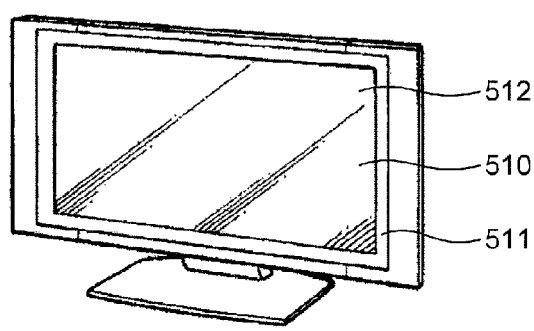
FIG. 29 is a diagram illustrating an example of an electronic apparatus including the display device according to the embodiment.

The electronic apparatus illustrated in FIG. 29 is a television device to which the display device 10 is applied. Examples of the television device include, but are not limited to, a video display screen unit 510 that includes a front panel 511 and a filter glass 512. The display device 10 is applied to the video display screen unit 510. It means that the screen of the television device can have a function to detect touch operations in addition to a function to display images.

4-2. Application Example 2

Figure 30:
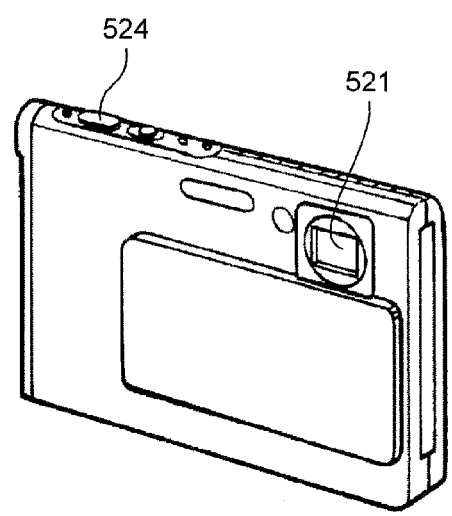
FIG. 30 is a diagram illustrating an example of the electronic apparatus including the display device according to the embodiment.
Figure 31:
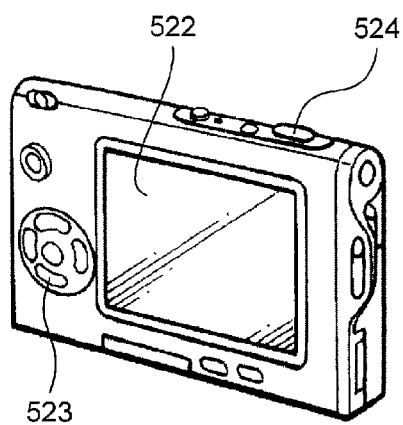
FIG. 31 is a diagram illustrating an example of the electronic apparatus including the display device according to the embodiment.

The electronic apparatus illustrated in FIGS. 30 and 31 is a digital camera to which the display device 10 is applied. Examples of the digital camera include, but are not limited to, a light-emitting unit 521 for flash, a display unit 522, a menu switch 523, and a shutter button 524. The display device 10 is applied to the display unit 522. This allows the display unit 522 of the digital camera to have the function to detect touch operations in addition to the function to display images.

4-3. Application Example 3

Figure 32:
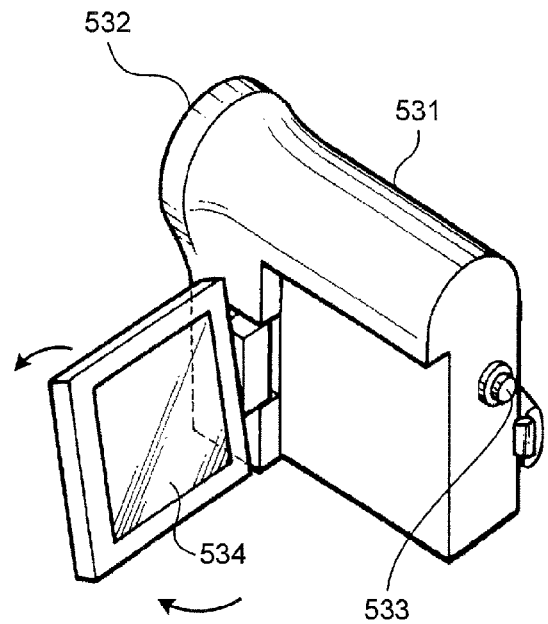
FIG. 32 is a diagram illustrating an example of the electronic apparatus including the display device according to the embodiment.

The electronic apparatus illustrated in FIG. 32 represents an external appearance of a video camera to which the display device 10 is applied. Examples of the video camera include, but are not limited to, a body 531, a lens 532 for taking a subject and provided on the front side face of the body 531, a start/stop switch 533 that is used during shooting, and a display unit 534. The display device 10 is applied to the display unit 534. This allows the display unit 534 of the video camera to have the function to detect touch operations in addition to the function to display images.

4-4. Application Example 4

Figure 33:
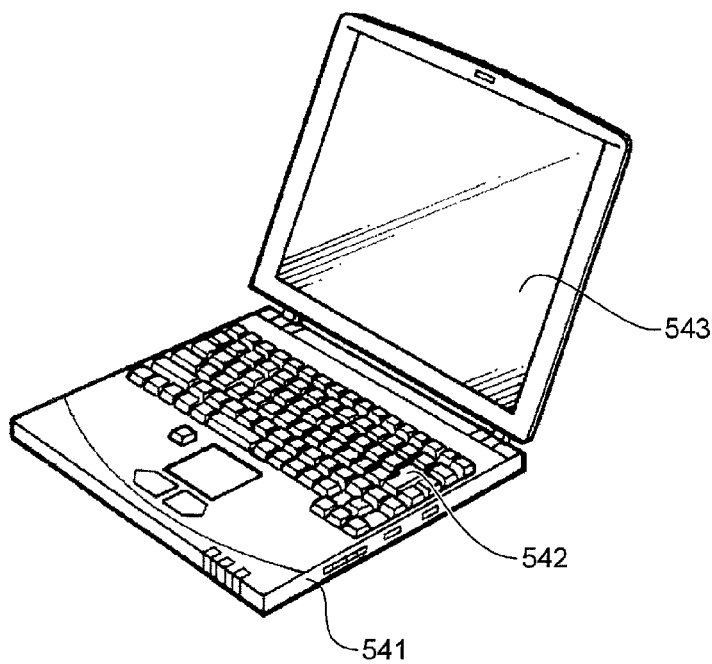
FIG. 33 is a diagram illustrating an example of the electronic apparatus including the display device according to the embodiment.
Figure 34:
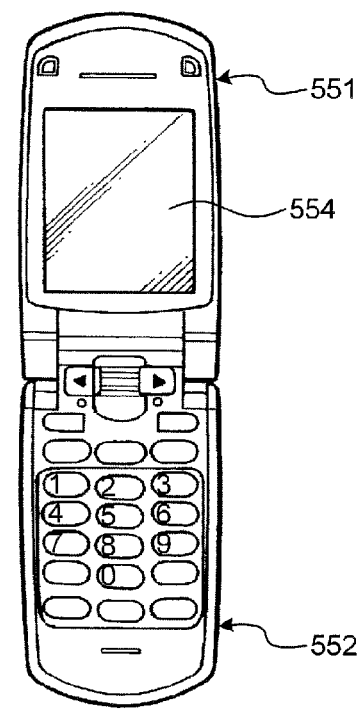
FIG. 34 is a diagram illustrating an example of the electronic apparatus including the display device according to the embodiment.
Figure 35:
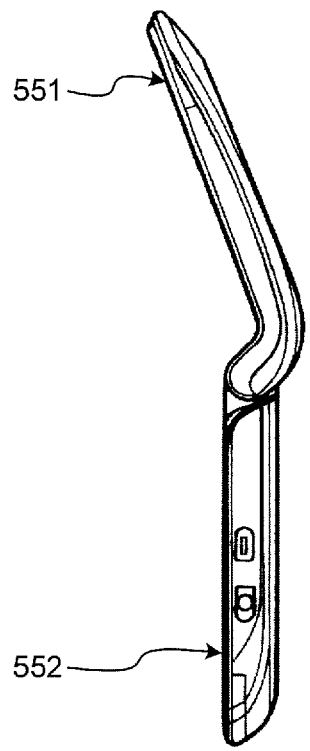
FIG. 35 is a diagram illustrating an example of the electronic apparatus including the display device according to the embodiment.
Figure 36:
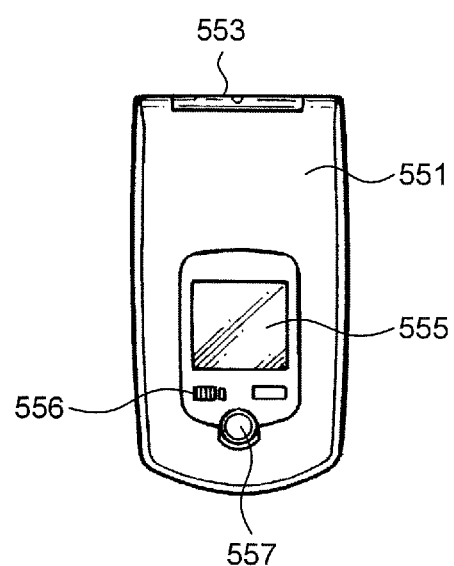
FIG. 36 is a diagram illustrating an example of the electronic apparatus including the display device according to the embodiment.
Figure 37:
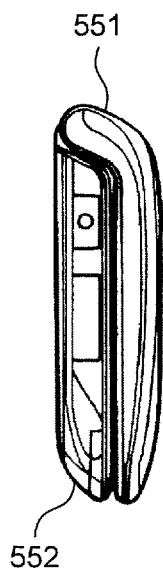
FIG. 37 is a diagram illustrating an example of the electronic apparatus including the display device according to the embodiment.
Figure 38:
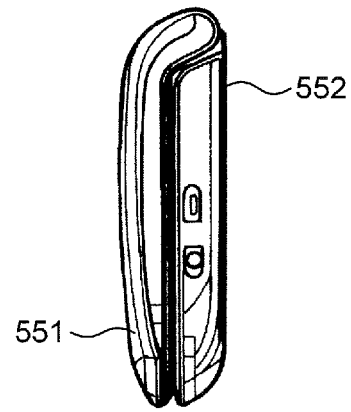
FIG. 38 is a diagram illustrating an example of the electronic apparatus including the display device according to the embodiment.
Figure 39:
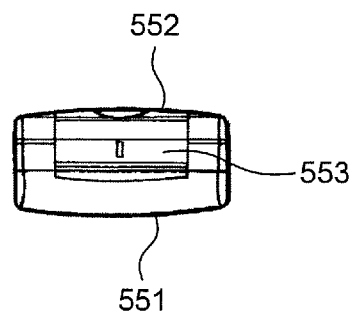
FIG. 39 is a diagram illustrating an example of the electronic apparatus including the display device according to the embodiment.
Figure 40:
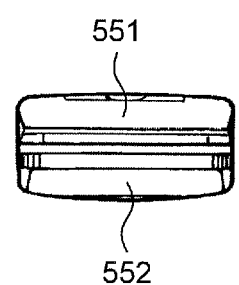
FIG. 40 is a diagram illustrating an example of the electronic apparatus including the display device according to the embodiment.

The electronic apparatus illustrated in FIG. 33 is a notebook type personal computer to which the display device 10 is applied. Examples of this notebook type personal computer include, but are not limited to, a body 541, a keyboard 542 for input operation of characters, etc., and a display unit 543 that displays images. The display device 10 is applied to the display unit 543. This allows the display unit 543 of the notebook type personal computer to have the function to detect touch operations in addition to the function to display images.

4-5. Application Example 5

The electronic apparatus illustrated in FIGS. 34 to 40 is a mobile phone to which the display device 10 is applied. Examples of this mobile phone are, but are not limited to, composed of an upper housing 551 and a lower housing 552 coupled to each other by a connection unit (hinge unit) 553, and includes a display 554, a subdisplay 555, a picture light 556, and a camera 557. The display device 10 is mounted as the display 554. This allows the display 554 of the mobile phone to have the function to detect touch operations in addition to the function to display images.

4-6. Application Example 6

Figure 41:
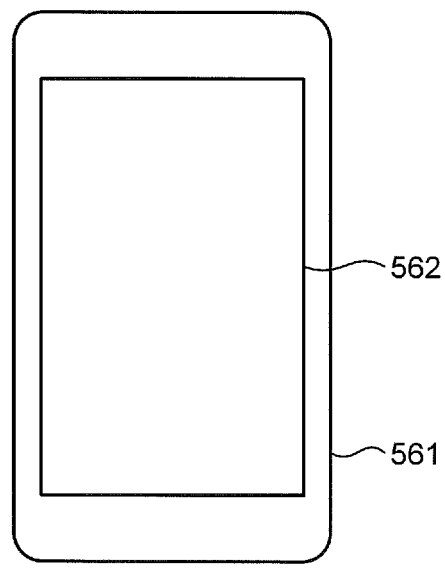
FIG. 41 is a diagram illustrating an example of the electronic apparatus including the display device according to the embodiment.

The electronic apparatus illustrated in FIG. 41 is a mobile information device that operates as a portable computer, a multifunctional mobile phone, a portable computer with voice call capability, or a portable computer with communication capability, and that is sometimes called a smartphone or a tablet computer. Examples of the mobile information device include, but are not limited to, a display unit 562 on a surface of a housing 561. The display device 10 is mounted as the display unit 562. The display unit 562 can have the function to detect touch operations in addition to the function to display images.

5. Aspects of Present Disclosure

The present disclosure can include the following aspects.

(1) A display device comprising:

an image display panel that includes arrays of pixels including a plurality of sub-pixels, the arrays of pixels including cyclically arranged columns of first columns each of which includes first sub-pixels, second columns each of which is arranged next to the corresponding first column and includes second sub-pixels, and third columns each of which is arranged next to the corresponding second column;

a display function layer that has an image display function of displaying an image on the image display panel;

a plurality of data lines each coupled to one of the first columns, the second columns, and the third columns;

a control unit that drives the display function layer based on image signals by a column inversion driving method in which voltage applied to the data lines are different between the adjacent sub-pixels or between the adjacent pixels, and polarities of the applied voltages are inverted at a predetermined period; and a plurality of scan lines with which the control unit sequentially selects each row of the sub-pixels, wherein third sub-pixels and fourth sub-pixels are alternately arranged in the third columns in the direction along the third columns, and the third sub-pixels and the fourth sub-pixels are alternately arranged in a direction along the row in the same row of the third columns, and each of the scan lines is coupled to either of the third sub-pixels adjacent thereto or the fourth sub-pixels adjacent thereto, as sub-pixels to be selected thereby.

(2) The display device according to (1), wherein the control unit transmits image signals to be transmitted to the sub-pixels of every other one of the third columns arranged in a direction along the row so as to shift the image signals from the other sub-pixels in the same row by one horizontal pixel.

(3) The display device according to (1), wherein the scan lines are coupled to the third sub-pixels of both adjacent rows, or the fourth sub-pixels of both adjacent rows.

(4) The display device according to (1), wherein the sub-pixels of the third columns in the same row are coupled to alternately different one of the scan lines.

(5) The display device according to (1), wherein the sub-pixels in the same row are coupled to different one of the scan lines alternately for each pixel.

(6) The display device according to (1), further comprising a touch detection device attached or integrated on the image display panel, the touch detection device being capable of detecting an external approaching object that externally comes close.

(7) An electronic apparatus including a display device, the display device comprising:

an image display panel that includes arrays of pixels including a plurality of sub-pixels, the arrays of pixels including cyclically arranged columns of first columns each of which includes first sub-pixels, second columns each of which is arranged next to the corresponding first column and includes second sub-pixels, and third columns each of which is arranged next to the corresponding second column;

a display function layer that has an image display function of displaying an image on the image display panel;

a plurality of data lines each coupled to one of the first columns, the second columns, and the third columns;

a control unit that drives the display function layer based on image signals by a column inversion driving method in which voltage applied to the data lines are different between the adjacent sub-pixels or between the adjacent pixels, and polarities of the applied voltages are inverted at a predetermined period; and a plurality of scan lines with which the control unit sequentially selects each row of the sub-pixels, wherein third sub-pixels and fourth sub-pixels are alternately arranged in the third columns in the direction along the third columns, and the third sub-pixels and the fourth sub-pixels are alternately arranged in a direction along the row in the same row of the third columns, and each of the scan lines is coupled to either of the third sub-pixels adjacent thereto or the fourth sub-pixels adjacent thereto, as sub-pixels to be selected thereby.

As described above, the display device of the present disclosure can be driven by the column inversion driving method, and therefore consumes low power. The display device of the present disclosure can also suppress signals of a common electrode that activates the crosstalk. These advantages allow the display device of the present disclosure to mitigate the display quality deterioration and to provide an image or a video having higher luminance. Inclusion of the display device of the present disclosure allows the electronic apparatus of the present disclosure to suppress the power consumption of the display device and to reduce the display quality deterioration of the display device.

According to one aspect of the present disclosure, a display device and an electronic apparatus that suppress power consumption and reduce display quality deterioration of the display device can be provided.

Although the present disclosure has been described above, the present disclosure is not limited to the above description. The constituent elements of the present disclosure described above include elements easily conceived by those skilled in the art, substantially identical elements, and elements in the range of what are called equivalents. The above-described constituent elements can be combined as appropriate. The constituent elements can be omitted, replaced, and/or modified in various ways within the scope not deviating from the gist of the present disclosure.

What is claimed is:

1. A display device comprising:
    an image display panel that includes arrays of pixels including a plurality of sub-pixels, the arrays of pixels including cyclically arranged columns of first columns that include first sub-pixels, second columns each of which is arranged next to the corresponding first column and third columns each of which is arranged next to the corresponding second column;
    a display function layer that has an image display function of displaying an image on the image display panel;
    a plurality of data lines each coupled to one of the first columns, the second columns, and the third columns;
    a control unit that drives the display function layer based on image signals by a column inversion driving method in which voltage applied to the data lines are different between the adjacent sub-pixels or between the adjacent pixels, and polarities of the applied voltages are inverted at a predetermined period; and
    a plurality of scan lines with which the control unit sequentially selects each row of the sub-pixels, wherein
    second sub-pixels and fifth sub-pixels are alternately arranged in the second columns in a direction along the second columns, and the second sub-pixels and the fifth sub-pixels corresponding to the second columns are alternately arranged in a direction along each row,
    third sub-pixels and fourth sub-pixels are alternately arranged in the third columns in a direction along the third columns, and the third sub-pixels and the fourth sub-pixels corresponding to the third columns are alternately arranged in a direction along each row,
    each of the scan lines is coupled to the first sub-pixels of a same row,
    each of the scan lines is coupled to the fifth sub-pixels of the second columns and the third sub-pixels of the third columns, or the second sub-pixels of the second columns and the fourth sub-pixels of the third columns, the fifth sub-pixels and the third sub-pixels being the sub-pixels of two rows each adjacent to the scan line, and the second sub-pixels and the fourth sub-pixels being the sub-pixels of two rows each adjacent to the scan line, and
    the sub-pixels of the second columns or the third columns in a same row are coupled to alternately different scan lines both of which are adjacent to the sub-pixels of the same row.

2. The display device according to claim 1, wherein
    the control unit transmits image signals to the sub-pixels of every other one of the second columns arranged in the direction along each row and the sub-pixels of every other one of the third columns arranged in the direction along each row so as to shift the image signals from the other sub-pixels in the same row by one horizontal pixel.

3. The display device according to claim 1, further comprising
    a touch detection device attached or integrated on the image display panel, the touch detection device being capable of detecting an external approaching object that externally comes close.

4. An electronic apparatus including a display device, the display device comprising:
    an image display panel that includes arrays of pixels including a plurality of sub-pixels, the arrays of pixels including cyclically arranged columns of first columns each of which includes first sub-pixels, second columns each of which is arranged next to the corresponding first column and third columns each of which is arranged next to the corresponding second column;
    a display function layer that has an image display function of displaying an image on the image display panel;
    a plurality of data lines each coupled to one of the first columns, the second columns, and the third columns;
    a control unit that drives the display function layer based on image signals by a column inversion driving method in which voltage applied to the data lines are different between the adjacent sub-pixels or between the adjacent pixels, and polarities of the applied voltages are inverted at a predetermined period; and
    a plurality of scan lines with which the control unit sequentially selects each row of the sub-pixels, wherein
    second sub-pixels and fifth sub-pixels are alternately arranged in the second columns in a direction along the second columns, and the second sub-pixels and the fifth sub-pixels corresponding to the second columns are alternately arranged in a direction along each row,
    third sub-pixels and fourth sub-pixels are alternately arranged in the third columns in a direction along the third columns, and the third sub-pixels and the fourth sub-pixels corresponding to the third columns are alternately arranged in a direction along each row,
    each of the scan lines is coupled to the first sub-pixels of a same row,
    each of the scan lines is coupled to the fifth sub-pixels of the second columns and the third sub-pixels of the third columns, or the second sub-pixels of the second columns and the fourth sub-pixels of the third columns, the fifth sub-pixels and the third sub-pixels being the sub-pixels of two rows each adjacent to the scan line, and the second sub-pixels and the fourth sub-pixels being the sub-pixels of two rows each adjacent to the scan line, and
    the sub-pixels of the second columns or the third columns in a same row are coupled to alternately different scan lines both of which are adjacent to the sub-pixels of the same row.

* * * * *